United States Patent [19]
Shin et al.

[11] Patent Number: 6,002,079
[45] Date of Patent: Dec. 14, 1999

[54] LUMINOUS DECORATIVE DEVICE

[76] Inventors: Haeng Chul Shin, Donglimhaichu 701, 390-6, Yongho3-dong, Nam-ku, Pusan; Kang Jung Park, Usung A.P.T. 101-1407, 57, Kaeqeum3-dong, Pusanjin-ku, Pusan, both of Rep. of Korea

[21] Appl. No.: 09/005,270

[22] Filed: Jan. 9, 1998

[30] Foreign Application Priority Data

Jan. 24, 1997 [KR] Rep. of Korea ............... 97-970
Aug. 26, 1997 [KR] Rep. of Korea ............ 97-40887

[51] Int. Cl.$^6$ ...................................... A63J 17/00
[52] U.S. Cl. ................................. 84/464 R; 84/600
[58] Field of Search ............... 84/600, 609, 634, 84/464 R, 464 A

[56] References Cited

U.S. PATENT DOCUMENTS

| | | | |
|---|---|---|---|
| 4,622,881 | 11/1986 | Rand ............................... | 84/464 R |
| 4,928,568 | 5/1990 | Snavely ........................... | 84/464 R |
| 5,266,732 | 11/1993 | Suzuki ............................ | 84/464 R |
| 5,402,702 | 4/1995 | Hata ............................... | 84/464 R |
| 5,461,188 | 10/1995 | Drago et al. .................... | 84/464 R |
| 5,668,333 | 9/1997 | Horton et al. .................. | 84/470 R |

*Primary Examiner*—Jeffrey Donels
*Attorney, Agent, or Firm*—Renner, Otto, Boisselle & Sklar

[57] ABSTRACT

A luminous decorative device with a melody generator is disclosed. The device includes a melody generator, a luminous source or member which is coupled to the melody generator and turned on and off or flickers in conjunction with the operation of the melody generator and a transparent decorative member which is formed with lots of reflecting recesses making the shape of a character and/or figure on the upper and/or lower surface thereof. The recess has at least one reflecting face which is oriented toward a direction in which the corresponding luminous member is disposed. The device can display the characters or figures so that they may look like flickering or twinkling.

19 Claims, 25 Drawing Sheets

LUMINOUS DECORATIVE DEVICE

BACKGROUND OF THE INVENTION

The present invention relates to a luminous decorative device and more particularly to a luminous decorative device having one or more decorative member formed with recesses in various shapes of characters and figures so that light rays having reflected off the reflecting faces thereof may display the characters and figures. The device according to the present invention may be applied to cake knives, congratulatory cards, sports shoes, headgear, ornaments, etc.

There has been known a cake knife provided with a melody generator attached to the handle for reproducing a music with the handle grasped. Although the knife can reproduce pleasant melodies by means of the melody generator, it has nothing to do with the visual effects.

Some ornaments attached on the goods such as sports shoes and headgear have a part on which characters and figures are printed. However, such ornaments have limited appealing or advertising effects with the statically printed characters or figures.

The Korean Utility Model Publication No. 92-8758 discloses a melody card with a flickering plastic board having characters engraved uninterruptedly with a V (or an inverted V) shape cross section on its lower surface and illuminated by an LED lamp. In such a melody card, for example, the English alphabets or consonants and vowels of the Korean alphabets are engraved in the shape of a uninterrupted groove. Parallel light rays emitted from an LED lamp and incident on the wall or surface of the groove opposing the LED lamp reflect off the surface toward the upper surface of the flickering board so that the user may recognize the character engraved in the board. However, the light rays emitted from the LED lamp can hardly reach another wall or surface of the groove, resulting in displaying an indistinct or obscure image of the character. For example, when parallel light rays are incident upon a wall of the groove forming a circle shape ◎ or the alphabet M from the right side, the characters will be seen as ◯ or ᴍ from the upper surface of the board, respectively.

To solve the problem of the indistinctiveness of the reflected image, all the surfaces of the board except the upper one are covered with silver foils in order for the scattered rays to be reflected toward the inside and the upper surface of the board. However, such an arrangement does not bring any satisfactory result for an improved visual effect, because the intensity of the rays reflected from the surfaces of the foil is lower than that of the directly incident rays from the lamp and the silver foils will increase production costs. In addition, it is very difficult to engrave complicated patterns or figures other than simple characters in the forms of uninterrupted grooves on a plastic board, which makes its application to be limited.

SUMMARY OF THE INVENTION

The present invention is directed to a luminous decorative device or luminous decorations that substantially obviate one or more of the problems due to limitations and disadvantages of the related arts.

An object of the present invention is to provide a luminous decorative device which has not only an audio effect but also an ornamental appearance enough to give celebratory and advertising effects and attract our eyes.

Additional features and advantages of the invention will be set forth in the following description and will be apparent from the description, or may be learned by practice of the invention. The objects and other advantages of the invention will be realized and attained by the structure particularly pointed out in the written description and claims as well as the appended drawings.

To achieve these and other advantages and in accordance with the objects of the present invention, a luminous decorative device according to the present invention comprises a melody generator, an ornamental or decorative member, the upper or lower surface of which has lots of reflecting recesses arranged to form a character or figure and a luminous member, wherein the melody generator reproduces a melody or music and at the same time the luminous member is turned on and off or flickers to emit light rays so that they may reach the reflecting faces of the reflecting recesses and be reflected toward the upper surface of the ornamental member, thus displaying the character or figure with a good visual effect.

It is to be understood that both of the foregoing general description and the following detailed description are exemplary and explanatory and are not intended to limit the scope of protection of the invention.

BRIEF DESCRIPTION OF THE ACCOMPANYING DRAWINGS

The accompanying drawings, which are included to provide a further understanding of the invention, illustrate preferred embodiments of the invention and together with the description serve to explain the principles of the invention. In these drawings;

FIG. 1b is an enlarged front section of the device as shown in FIG. 1a,

FIG. 2b is a side section of the device as shown in FIG. 2a;

FIG. 14a–14e show a decorative device according to a third preferred embodiment of the present invention, in which;

FIG. 14a is a plan view of the decorative device;

FIG. 14b is a cross section of the device having a set of two opposed reflecting slots and other slant reflecting slots;

FIG. 14c is a cross section of the device having a set of two adjacent reflecting recesses in the shape of an isosceles triangular prism and other recesses in the shapes of a right-angled triangular prism; and FIGS. 14d and 14e are plan views illustrating the operation of the device in FIG. 14a;

DETAILED DESCRIPTION OF PREFERRED EMBODIMENTS

Reference will now be made in detail to the preferred embodiments of the present invention, which are illustrated in the accompanying drawings.

Figure 1A:
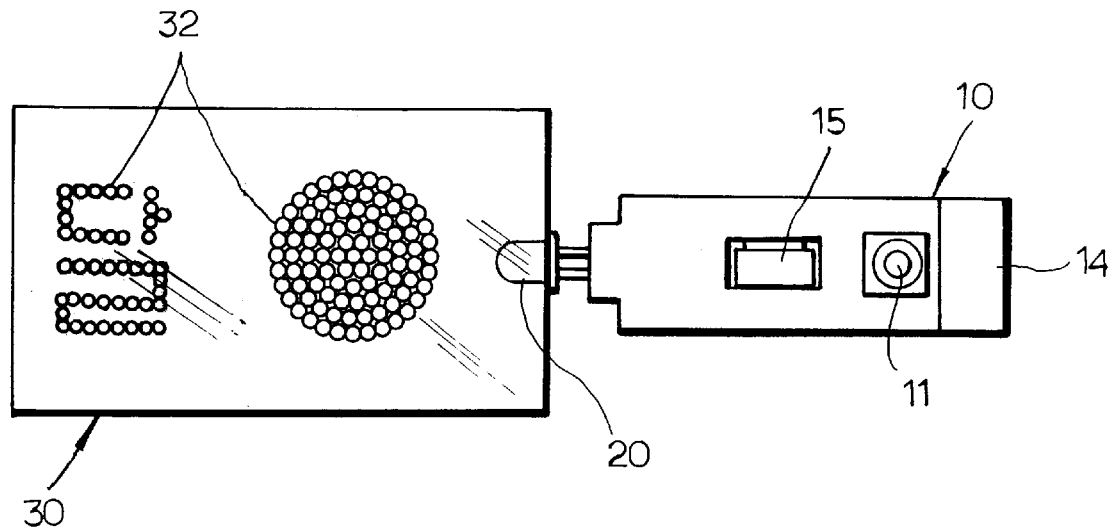
FIG. 1a is a plan view of an example of the luminous decorative device according to a first preferred embodiment of the present invention.
Figure 1B:
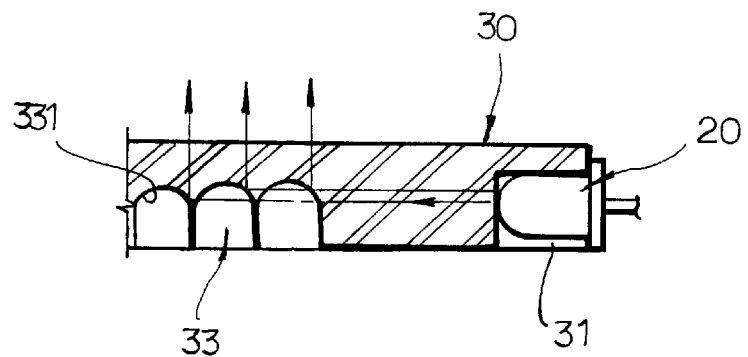
Figure 1C:
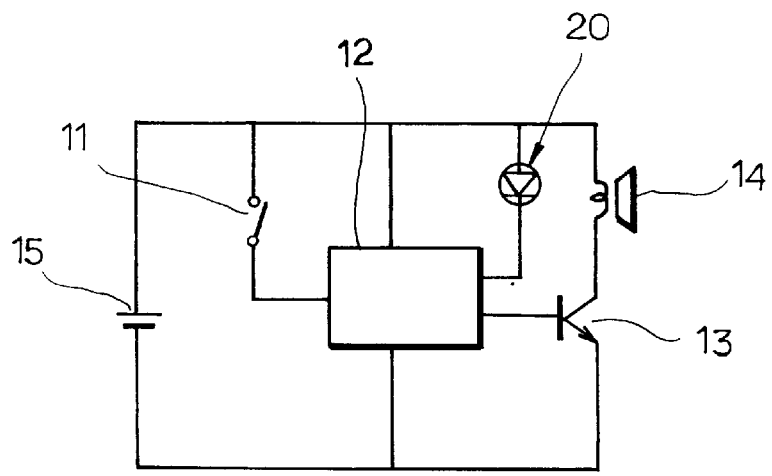
FIG. 1c is a circuit diagram applied to the device according to the present invention.

A luminous decorative device according to a first preferred embodiment of the present invention is illustrated in FIGS. 1a–1c. The device comprises a melody generator 10 having a switch 11, a melody IC element 12, an amplifying transistor 13, a speaker 14 and a dry battery 15 ; a luminous source or member 20 connected to the melody generator 10 and turned on and off in conjunction with the melody generator 10; and a flat decorative or ornamental member 30 having an opening 31 at the circumference to accommodate the luminous member 20 therein and numerous reflecting recesses 33 with a semicircular cross section which are provided on the lower surface to form a Korean character with the meaning of moon in English and a figure.

A typical push button or a vibrating switch may be used for the switch 11 and the luminous member 20 is preferably a luminous diode or LED.

The decorative member 30 is desirably made of a flexible and transparent material such as acrylate resin, nylon or various kinds of plastics, but the material is not limited to them. The lower and upper surfaces of the decorative member 30 on which characters and/or FIGS. 32 may be formed desirably remain transparent, whereas the rest parts of the two surfaces may be made opaque by coloring or putting a coating paper 34 on them.

Figure 5A:
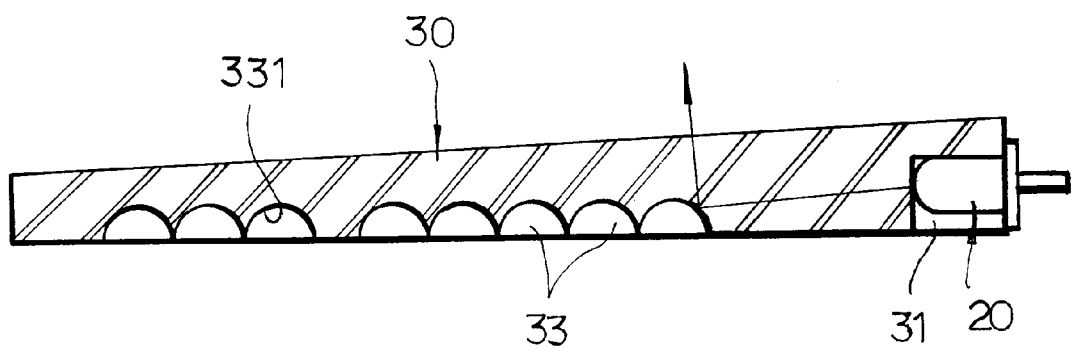
FIGS. 5a and 5b are cross sections of ornamental members of the device according to the first preferred embodiment of the present invention.

As shown in FIG. 5a, the decorative member 30 may be formed with a declined upper surface, making its thickness to be gradually reduced from one end, at which the luminous member 20 is disposed, toward another end.

Figure 4A:
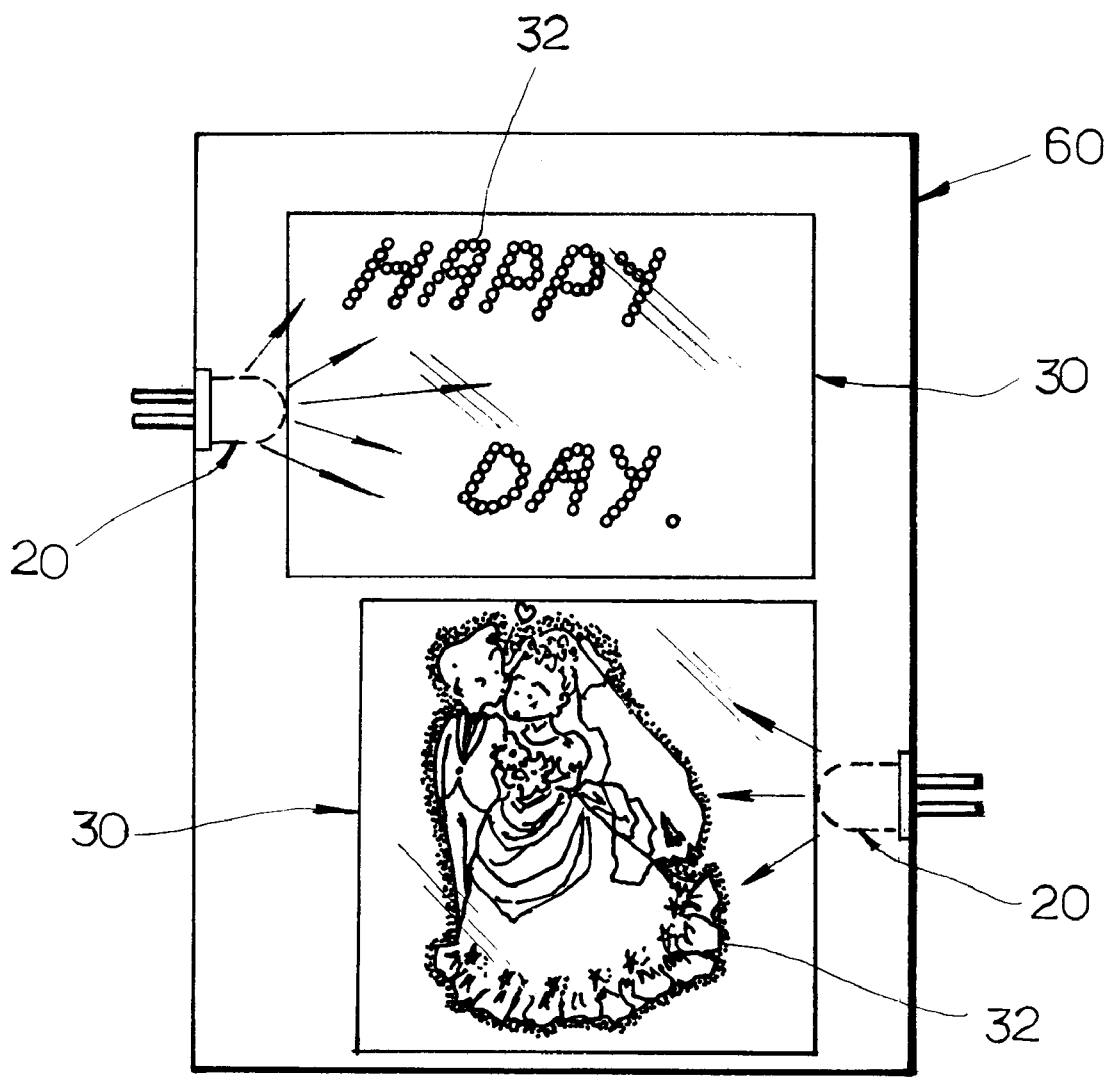
FIG. 4a illustrates a plan view of a congratulatory card as one of other examples of the device according to the first preferred embodiment of the present invention.
Figure 4B:
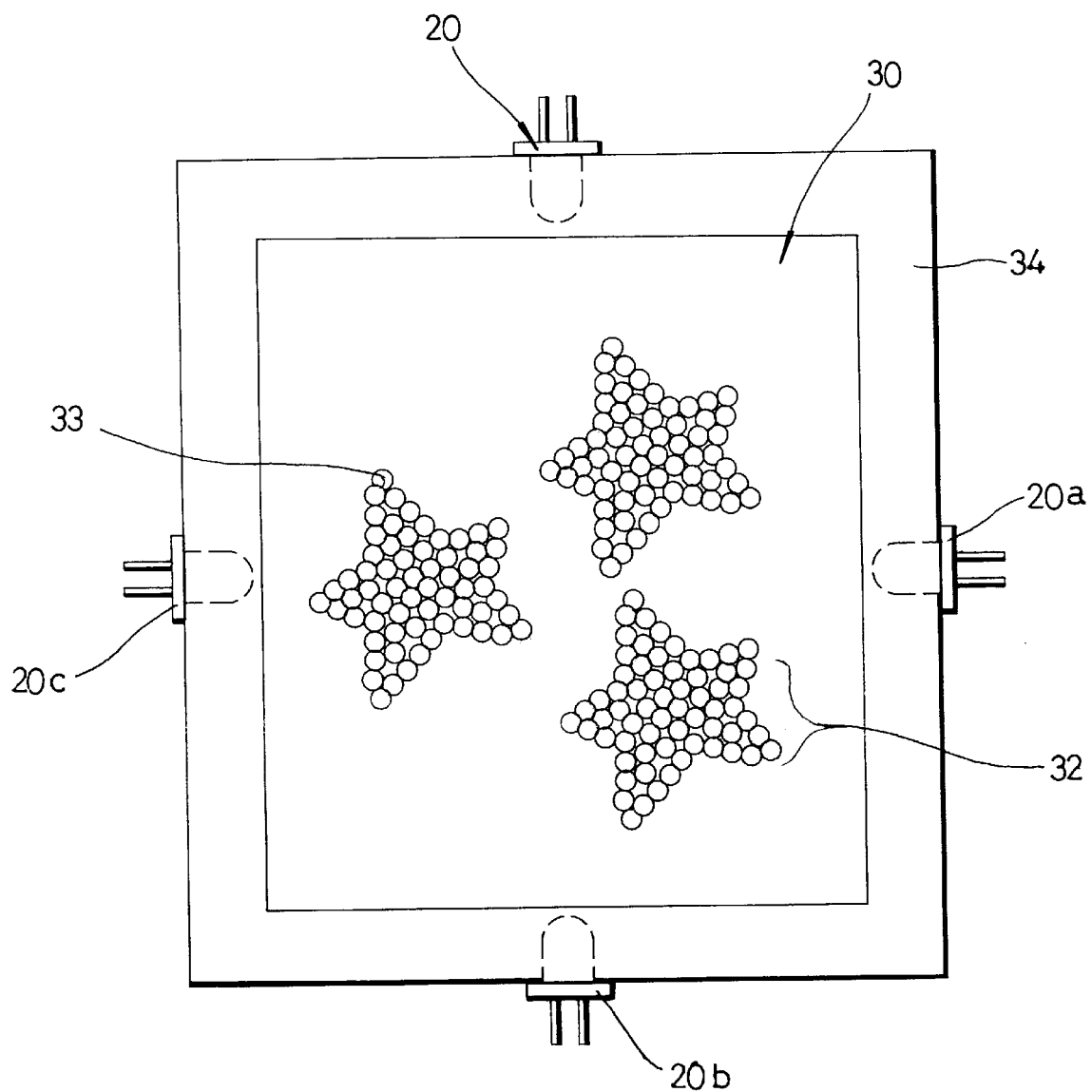
FIG. 4b is a front view of an ornament as one of other examples of the device according to the first embodiment of the invention.
Figure 5B:
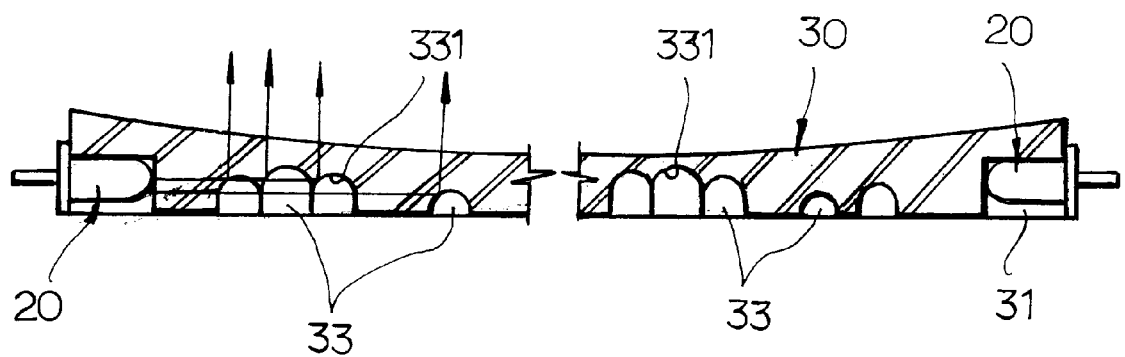

As shown in FIGS. 4a, 4b and 5b, if necessary, more than one luminous member 20 may be used for emitting rays of light enough to illuminate the whole range of the character or FIG. 32 which occupies quite a large or long region on the decorative member 30. For such a long or large member 30, as shown in FIG. 5b, the decorative member 30 may be gradually thickened outwardly. Such a difference of the thickness therebetween is desirable, because light rays from the luminous members 20 may not be fully dispersed outwardly but congested inwardly in the thinner parts of the decorative member 30 due to the shorter refraction width of the rays of light refracted in the thinner parts so that the intensity of rays reflected to and seen from the surface of the decorative member is almost the same regardless of the distance from the luminous sources 20. Thus, the character or FIG. 32 can be cleary displayed and seen all over the decorative member 30.

The reflecting recesses 33, each of which is formed to have a semicircular cross section, may have the same or different depth and/or diameter.

According to the first preferred embodiment of the present invention, when the luminous member 20 is turned on or flickers, light rays passing through the transparent decorative member 30 reach the reflecting faces 331 of the reflecting recesses 33. The light rays incident upon and reflecting off one reflecting face 331 are refracted toward the upper surface of the decorative member 30, while light rays incident upon another or the opposed reflecting face 331 are refracted toward the lower surface.

Because the light rays having passed through the spaces in the reflecting recesses 33 reflect off the reflecting face of the next reflecting recess toward the upper surface of the decorative member 30, the reflected rays of light can clearly display and show the character or FIG. 30 with a series of the dotted or lined rays reflected off a series of the reflecting recesses 33.

Figure 2A:
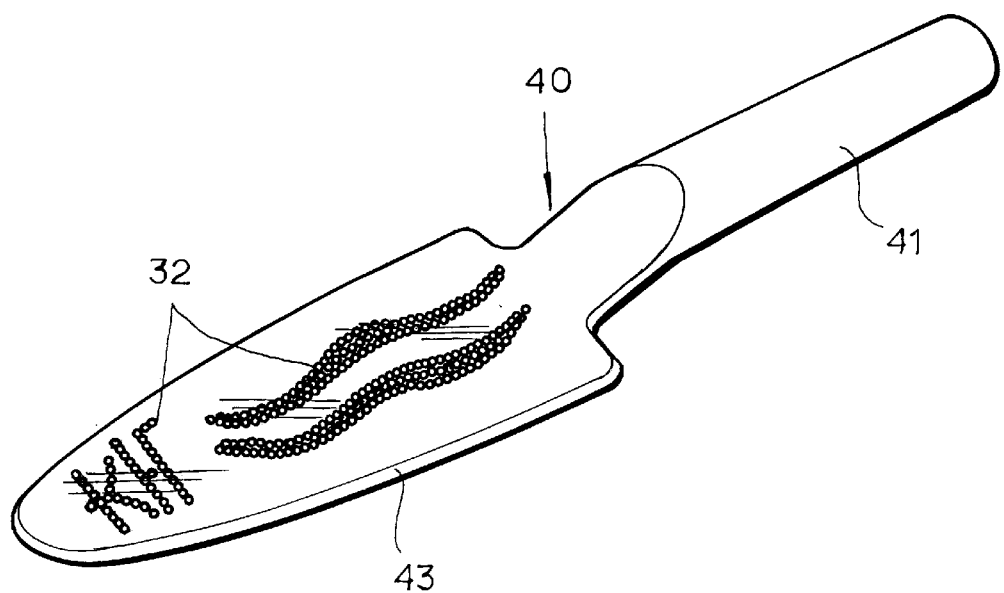
FIG. 2a illustrates a perspective view of another example of the device according to the first preferred embodiment of the present invention.
Figure 2B:
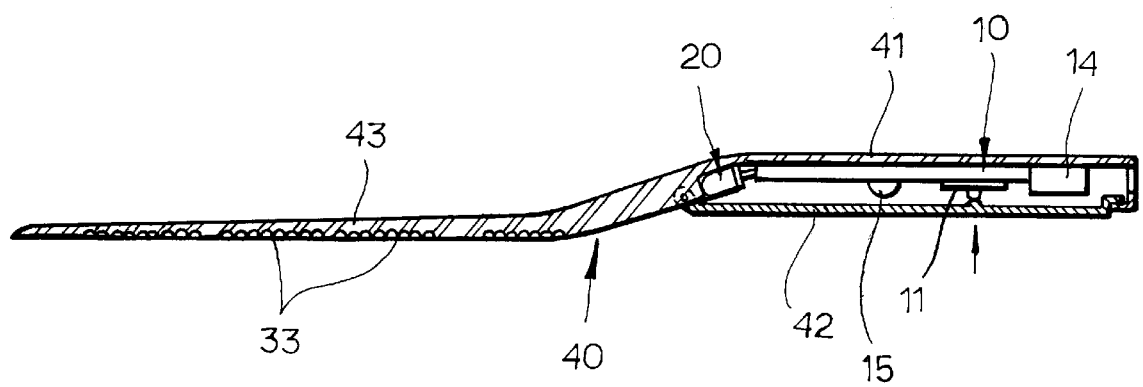

FIGS. 2a and 2b illustrate a cake knife made of transparent acrylate resin, which is another example of the device according to the first preferred embodiment of the present invention. The cake knife 40 comprises a melody generator 10 attached to the handle 41, a push plate 42 coupled to the handle 41 to press a switch 11 on, when a user grasps the handle and the press plate 42 together; a luminous member 20 arranged at the one end portion of the handle 41 and oriented toward the blade portion 43, on the lower surface of which a plurality of reflecting recesses 33 are formed in the shape of a character and a design 32.

When a user grasps the handle 41 and the push plate 42 together in order to use the knife 40, the switch 11 is pushed on by the push plate 42 and electric current from a dry battery 15 passes through the melody IC 12, reproducing a music through a speaker 14 and making the luminous member 20 turned on or flicker (See FIG. 1c).

At the same time, the light rays from the luminous member 20 are incident on the reflecting surfaces of the reflecting recesses formed on the lower surface of the blade portion 43 in the shapes of a character and a FIG. 32 and some of them are refracted toward the upper surface of the blade portion 20. Those rays of light reflected as such are seen as a character and a FIG. 32, glittering like a neon sign, while the luminous member 20 is repeatedly turned on and off or flickers in harmony with the reproduced music.

Figure 3:
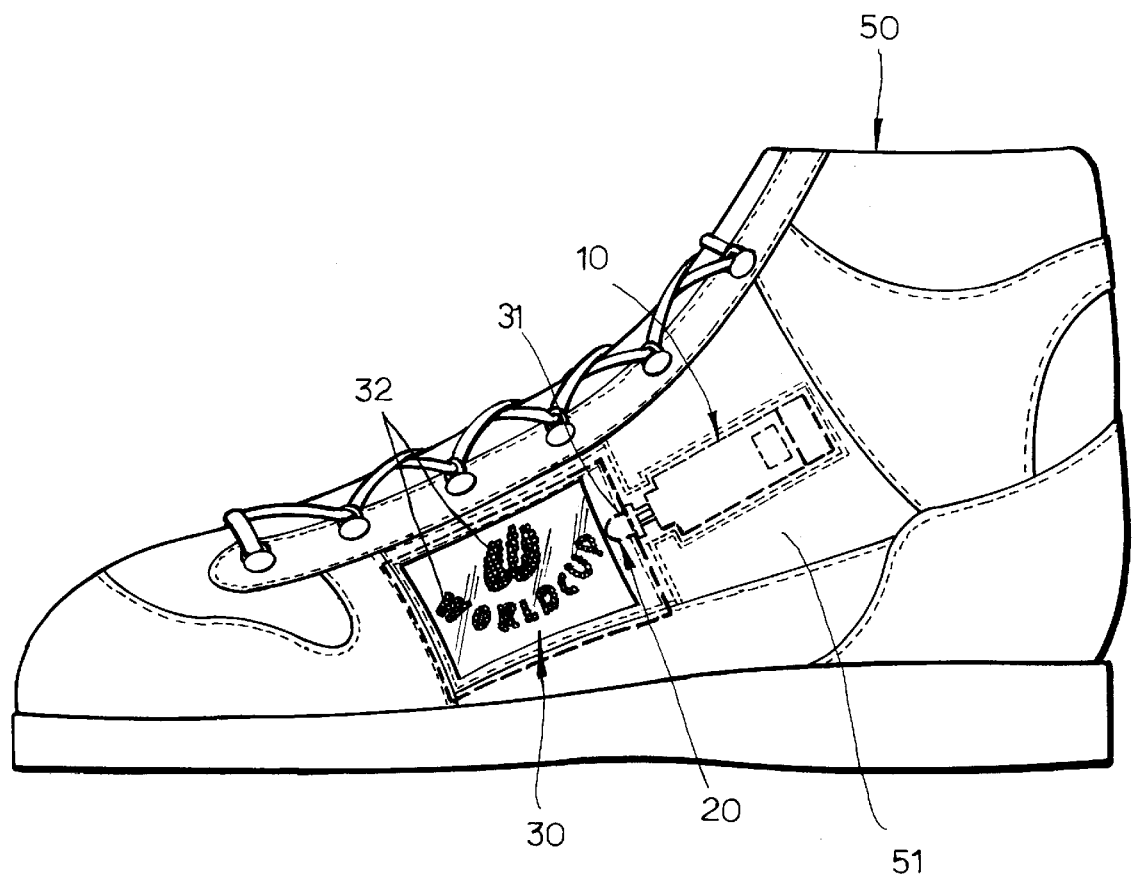
FIG. 3 illustrates still another example of the device according to the first preferred embodiment of the present invention.

FIG. 3 shows a sport shoe 50, which is another example of the device according to the first preferred embodiment of the present invention. An ornament 30, made of a kind of the flexible plastics sheets, is attached to the shoe 50 with the edges thereof sewn on an appropriate portion of the shoe 50. A luminous member 20 disposed in an opening 31 formed at one side of the ornament 30 and a melody generator 10 are fixed under the uppers 51 of the shoe 50.

While a user walks with the sport shoes 50 on, the switch 11, for example, a vibrating switch, is made on due to the walking vibration and a music is heard from the speaker 14 and the luminous member 20 is turned on and off so that the letters 32 may be seen from the upper surface of the ornament by means of the rays of light 30 reflecting off the numerous reflecting recesses 33 formed on the lower surface of the ornament 30 in the shape of a letter 32.

Referring to FIG. 4a, there is shown a large congratulatory card 60, which is still another example of the device according to the first preferred embodiment of the present invention and comprises a plurality of the ornamental members 30 on which several letters and a design are formed. As one luminous member 20 is not sufficient for the satisfactory luminance, used are two luminous members 20 with two melody generators connected thereto.

Referring to FIG. 4b, there is shown a further example of the device according to the first preferred embodiment of the present invention with several luminous members 20 which turn on and off by turns for one ornament 30, desirably emitting rays of light in the different colors and directions in order to have a better visual effect.

Although the present invention was explained for the examples such as a cake knife, sport shoes and a congratulatory card, the present invention is not limited thereto.

FIGS. 6–12 illustrate examples of the devices according to a second preferred embodiment of the present invention.

In this embodiment, the melody generator 10 and the luminous member 20 are the same as used in the first embodiment and only the shapes of the reflecting recesses 33 to form characters and/or FIGS. 32 on the upper and lower surfaces of an ornamental member 30 are different from those of the first embodiment.

Figure 6A:
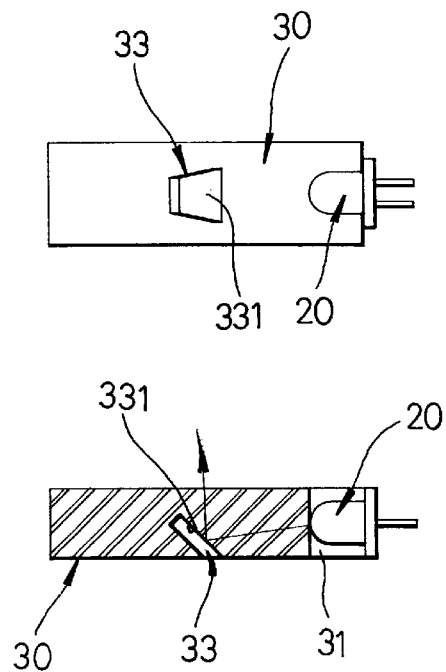
FIG 6a shows a plan view and a cross section of a reflecting slot.
Figure 6B:
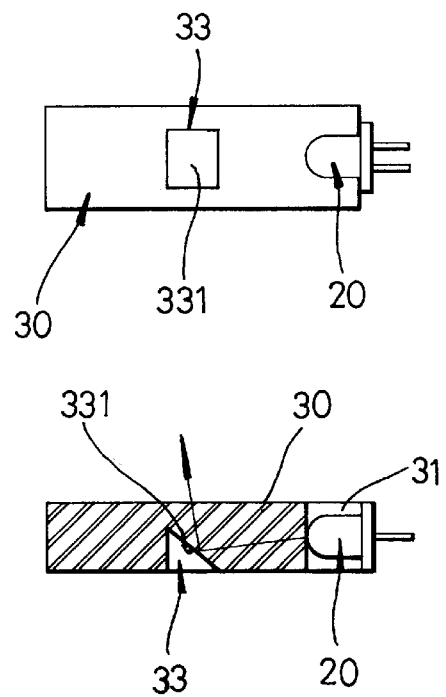
FIG. 6b shows a reflecting recess in the shape of a triangular prism.

According to the second preferred embodiment of the present invention, the reflecting recesses 33 are formed in the shape of a slant slot with two opposed reflecting faces 331 inclined at a certain angle as shown in FIG. 6a, or in the shape of a right-angled triangular prism with a reflecting face 331 as shown in FIG. 6b.

As for the slant reflecting recess or slot 33, the gap between the two reflecting faces may be uniform, but desirably becomes broader downwardly. Such a shape of the slots will help the projections on the pressing dice for providing recesses on the decorative member according to the present invention to form those slots easily and to be easily released from the slots formed on the surface of the ornamental member.

For the same size or length of the surface of the ornamental member, the number of the slant reflecting slots 33 may be greater than that of the triangular prism shape recesses, because the base of the latter is longer than that of the former.

Figure 7A:
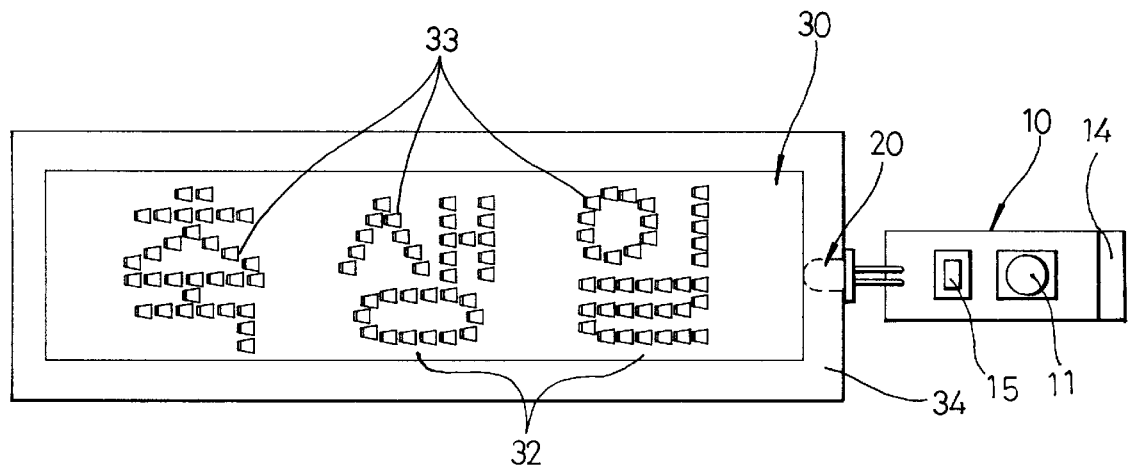
FIG. 7a is a plan view of a luminous decorative plate according to a second preferred embodiment of the present invention, provided with the reflecting recesses as shown in FIG. 6a or 6b.
Figure 7B:
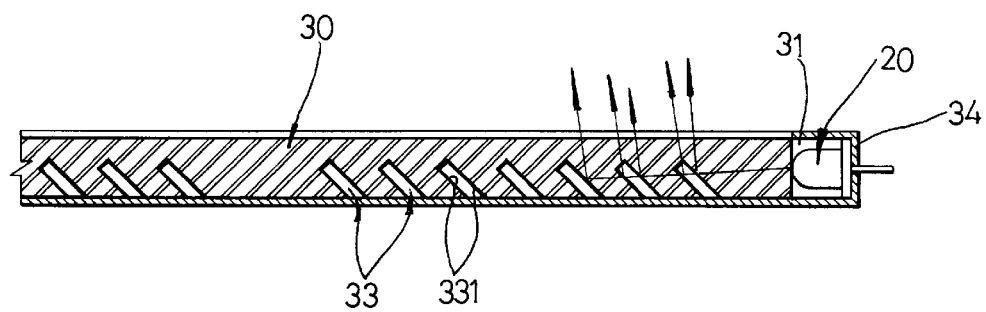
FIG. 7b is a front cross section of the plate shown in FIG. 7a, provided with the slant reflecting slots.
Figure 7C:
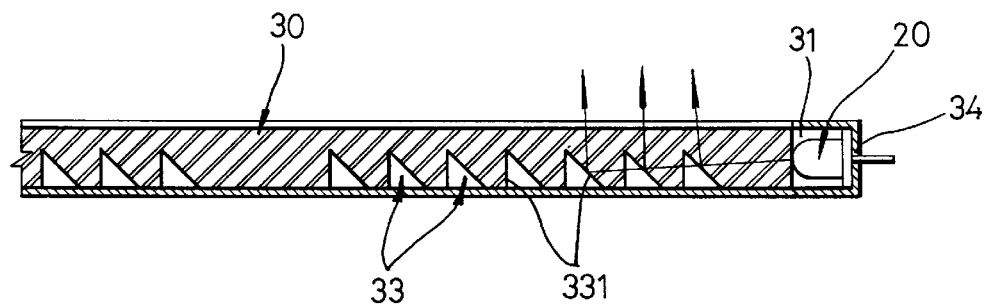
FIG. 7c is a front cross section of the plate shown in FIG. 7a, having the recesses in the shape of a right-angled triangle in cross section.

FIGS. 7a, 7b and 7c show a decorative device according to a second preferred embodiment of the invention, provided with the reflecting recesses 33 as shown in FIG. 6a or 6b. Referring to FIG. 7a, there are shown a decorative member 30 formed with the reflecting recesses 33 representing a Korean word with the meaning of happy birthday, a luminous member 20 and a melody generator 10.

FIG. 7b is a cross section of the decorative member, on the lower surface of which lots of slant slots are formed and FIG. 7c is a cross section of the decorative member, on the lower surface of which the reflecting recesses 33 are formed in the shape of a right-angled triangular prism, each of those recesses having a reflecting surface inclined in the opposite direction from the luminous member.

To prevent light rays from being dispersed outwardly too much, the decorative member 30 may desirably be wrapped with a light-shielding member 40 on the circumferential portion of the upper surface, the side surfaces and the bottom surface.

When the switch 11 is turned on, electric current from the battery 15 flows through the circuit, making a music reproduced and the luminous member 20 is turned on and off. The light rays from the luminous member 20 passing through the ornamental member 30 reflect off the reflecting faces 331 of the recesses 33, displaying the flickering letters.

Figure 8A:
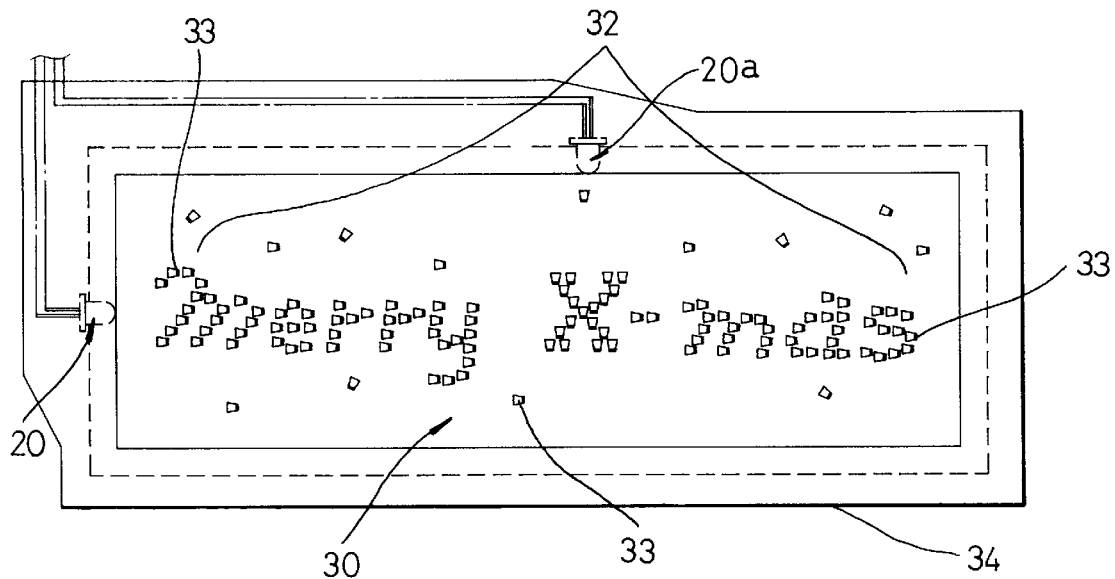
FIGS. 8a–8c are plan views illustrating a modification of the decorative plate according to the second preferred embodiment of the invention, provided with the reflecting recesses in FIG. 6a or 6b, and its operation.
Figure 8B:
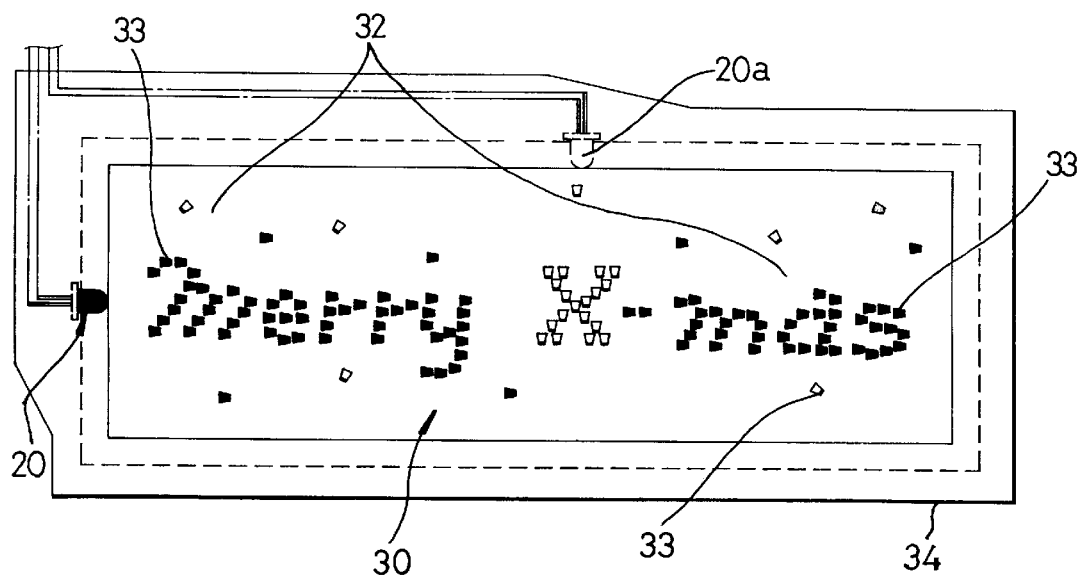
Figure 8C:
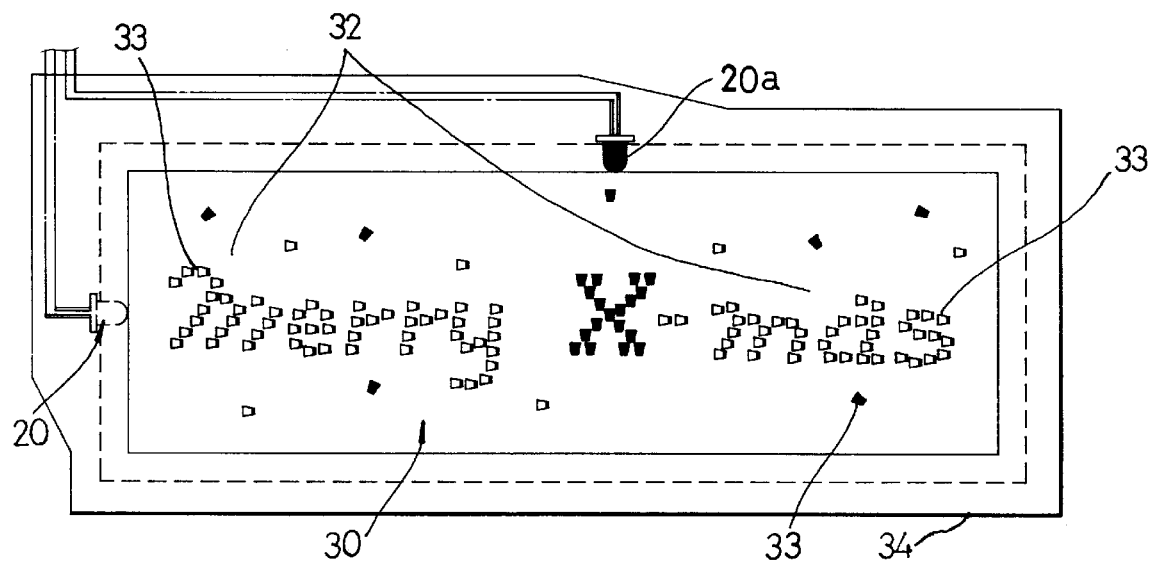

FIGS. 8a, 8b and 8c show another example of the decorative device according to the second embodiment of the present invention, wherein the reflecting recesses 33 are arranged to form the words, "Merry X-mas" and the reflecting faces 331 are oriented toward two different directions.

The reflecting faces 331 of the reflecting recesses 33 forming the character "X" are disposed toward the direction differing from those forming the words, "Merry", "-" and "mas" and the two luminous members 20 and 20a are arranged in their corresponding positions at the circumferential portions of the ornamental member.

There may be provided some additional reflecting recesses 33 other than those forming the words, Merry X-mas, scattered on the rest of the surface, which have the reflecting surfaces opposing one of the two luminous members 20 and 20a.

When one luminous member 20 is turned on, the reflecting faces of the recesses 33 forming the words "Merry", "-", and "mas" refract the light rays from that luminous member toward the upper surface of the ornamental member, displaying those words, as shown in FIG. 8b. With another luminous member 20a turned on, the alphabet "X" will appear as shown in FIG. 8c.

When the two luminous members 20 and 20a are turned on and off, the additional reflecting recesses 33 formed in the ornamental member 30 will reflect light rays alternately like the numerous twinkling stars.

In this device, the reflecting faces of the reflecting recesses forming the words "Merry", and "-","mas" are oriented toward the same direction and those forming "X" to another direction, but the reflecting faces of the reflecting recesses forming the word "Merry" may be oriented toward a direction differing from that for the words "X", and "-", "mas".

In order to display all the alphabets making an English word, I. e., five alphabets of the word "Merry", at the same time for catching its definite meaning, the reflecting faces of the reflecting recesses 33 representing the same word are preferably oriented toward the same direction. It is desirable that all the reflecting faces of the reflecting recesses 33 for the consonants and vowels in one Korean character are also formed so that they may be oriented toward the same direction.

In addition, as all the reflecting faces 331 of the respective reflecting recesses 33 forming the same word are oriented toward the same luminous member, they reflect the light rays simultaneously in the same direction, thus clearly displaying the characters or FIGS. 32, even though the reflecting recesses 33 are scattered far and wide over the ornamental member.

FIG. 9a–9e illustrate another example of the device formed with the reflecting recesses in accordance with the second preferred embodiment of the present invention, where the ornamental member 30 comprises two overlapped plates or boards 30a and 30b, on each of which the reflecting recesses 33 are arranged to represent the characters or FIGS. 32 and which are overlapped with each other.

In this device, as a Korean word "유성" is formed on the upper board 30a and its English equivalent "yu sung" on the lower board 30b, or vice versa, the reflecting recesses 33 for the Korean word "유성" may have a reflective direction which is different from that of the reflecting recesses for its English equivalent "yu sung".

The reflecting faces 331 of the reflecting recesses 33 formed on the boards 30a and 30b for representing two different characters or figures are oriented toward two different directions and reflect the light rays from the corresponding luminous member. Thus, the two different characters or FIGS. 32 formed on the respective boards 30a and 30b may not glitter simultaneously, but may be displayed alternately. If necessary, the reflecting faces of the reflecting recesses for the neighbouring two characters "유(yu)" and "성(sung)" may be oriented toward the two different directions respectively.

The respective luminous members may have different colors and one word or character may have more than one luminous members.

For example, red and yellow luminous members 20 and 20a may be arranged for the Korean letter "유", blue and yellow luminous members 20b and 20c for the Korean letter "성", and a red luminous member 20d for "yu sung". These luminous members may be turned on and off in a selective or combinative manner.

Figure 9A:
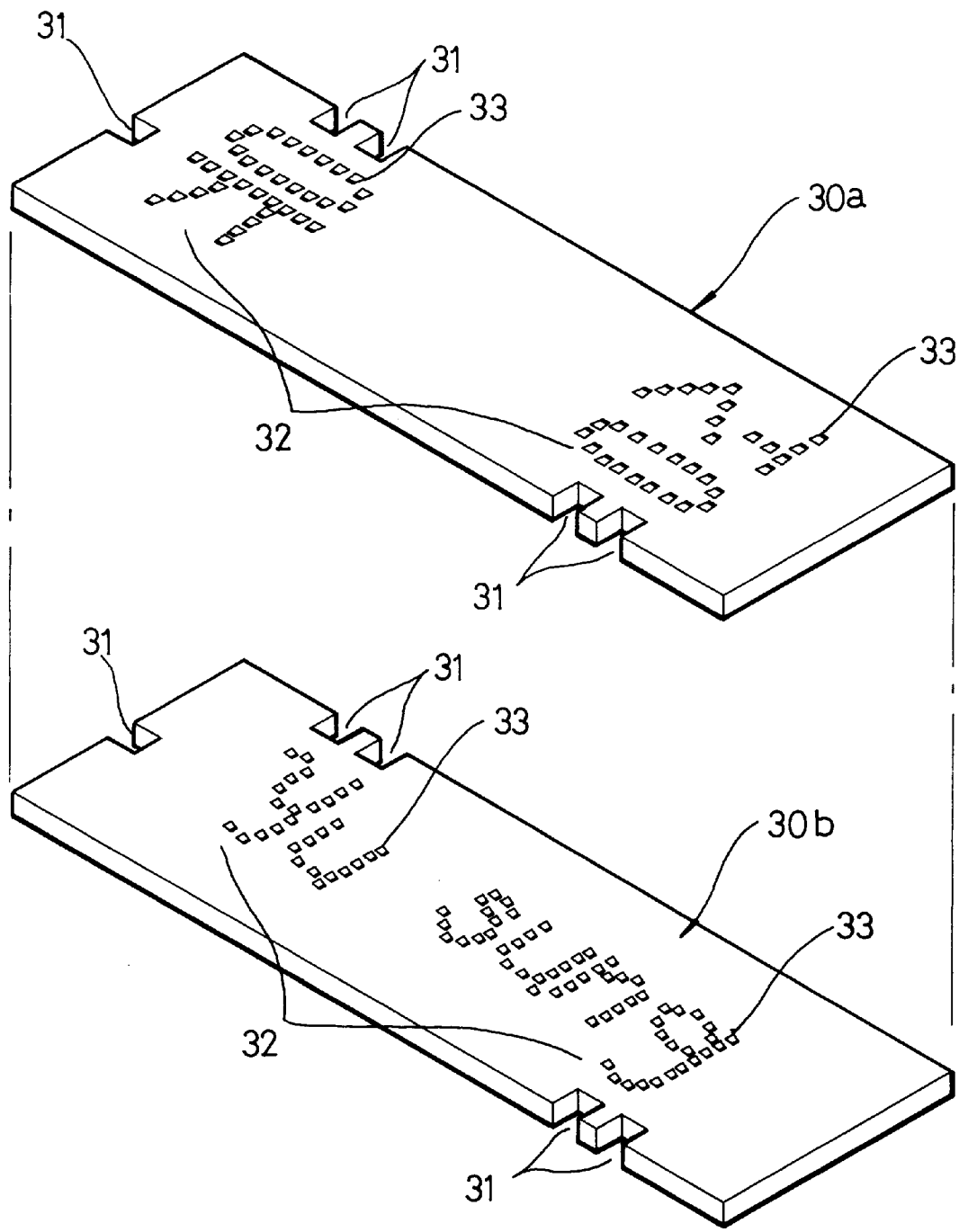
FIGS. 9a–9e are an exploded perspective view and plan views illustrating still another modification of the decorative plate provided with the reflecting recesses as shown in FIG. 6a or 6b.
Figure 9B:
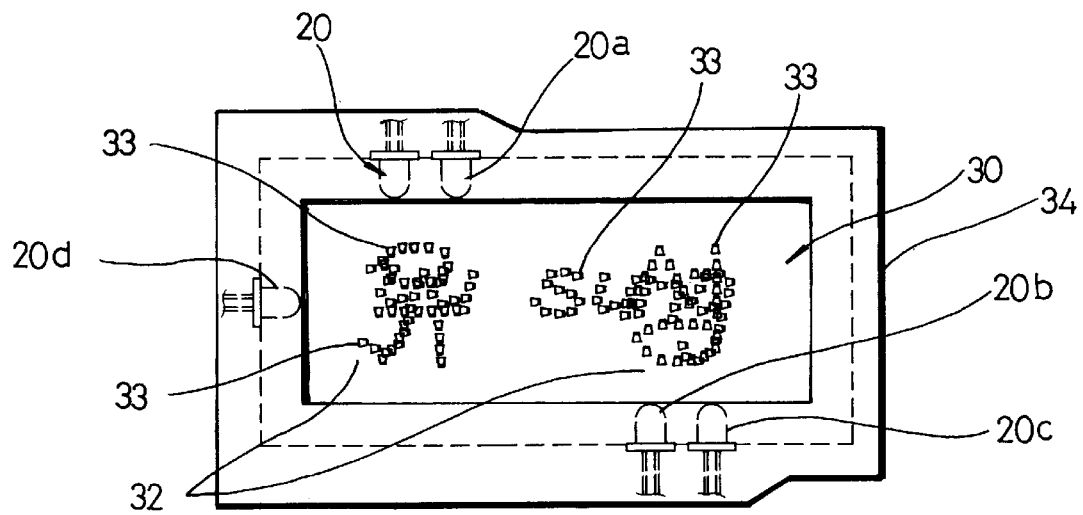
Figure 9C:
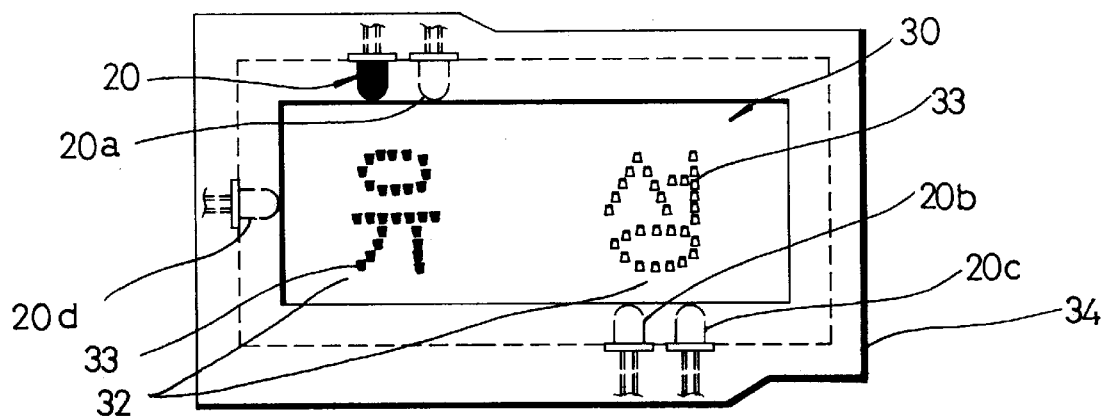

As shown in FIG. 9c, the reflecting recesses 33 for "유" will refract only red light rays from the luminous member 20, displaying only "유" in red. With the luminous member 20a turned on and the luminous member 20 turned off, "유" will glitter in yellow.

Figure 9D:
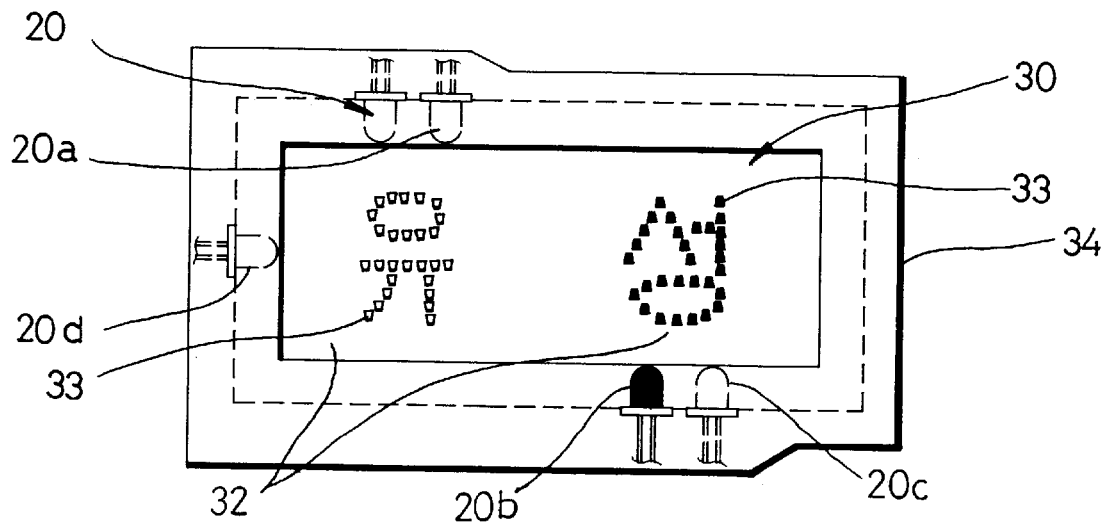

The reflecting faces of the reflecting recesses 33 for "성" will reflect only blue light rays from the luminous member 20b, displaying only "성" in blue. With the luminous member 20c turned on and luminous member 20b turned off, "성" will flash in yellow, as shown in FIG. 9d.

Figure 9E:
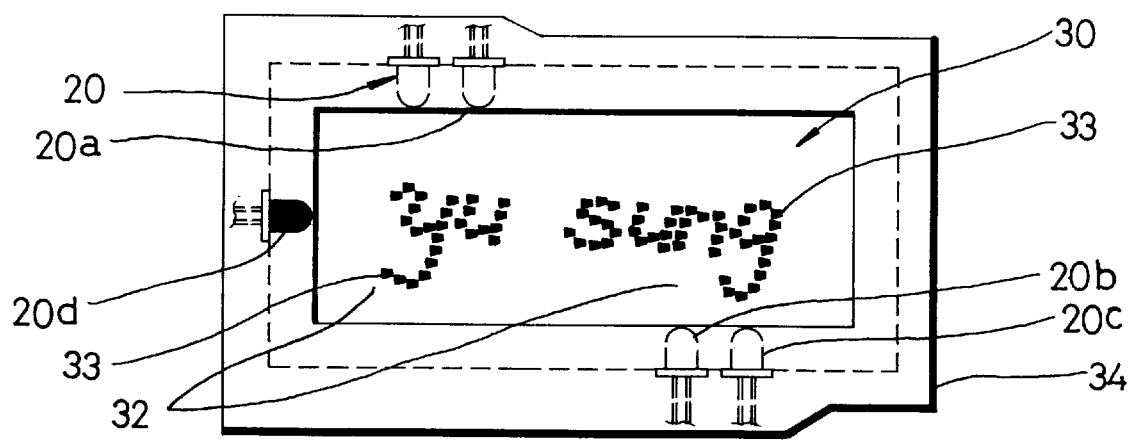

When the luminous member 20d is turned on, the English characters "yu sung" will be displayed in red, as shown in FIG. 9e.

As described above, the words "유성" and "yu sung" can be displayed in different colors to give the same effect as a neon sign by operating the luminous members 20, 20a, 20b, 20c and 20d in a selective or combinative manner.

FIGS. 10a–10e illustrate a further example of the device in accordance with the second preferred embodiment of the present invention.

In this device, the characters or FIGS. 32 are formed on either of the lower and upper surfaces of the ornamental member 30. The reflecting faces of the reflecting recesses 33 for the characters or FIGS. 32 formed on the upper surface are oriented toward a direction opposed to that for the characters or FIGS. 32 on the lower surface, while the two luminous members 20 and 20a are disposed at the opposite ends of the ornamental member 30 and switched on and off by turns so that the characters or FIGS. 32 on either side of the lower and upper surfaces may be displayed by turns.

For example, if you want to display the Korean characters "코스코" from the upper surface and its English equivalent "COSCO" from the lower surface, two luminous members 20 and 20a may be disposed against each other at the opposite ends of the ornamental member 30.

Figure 10A:
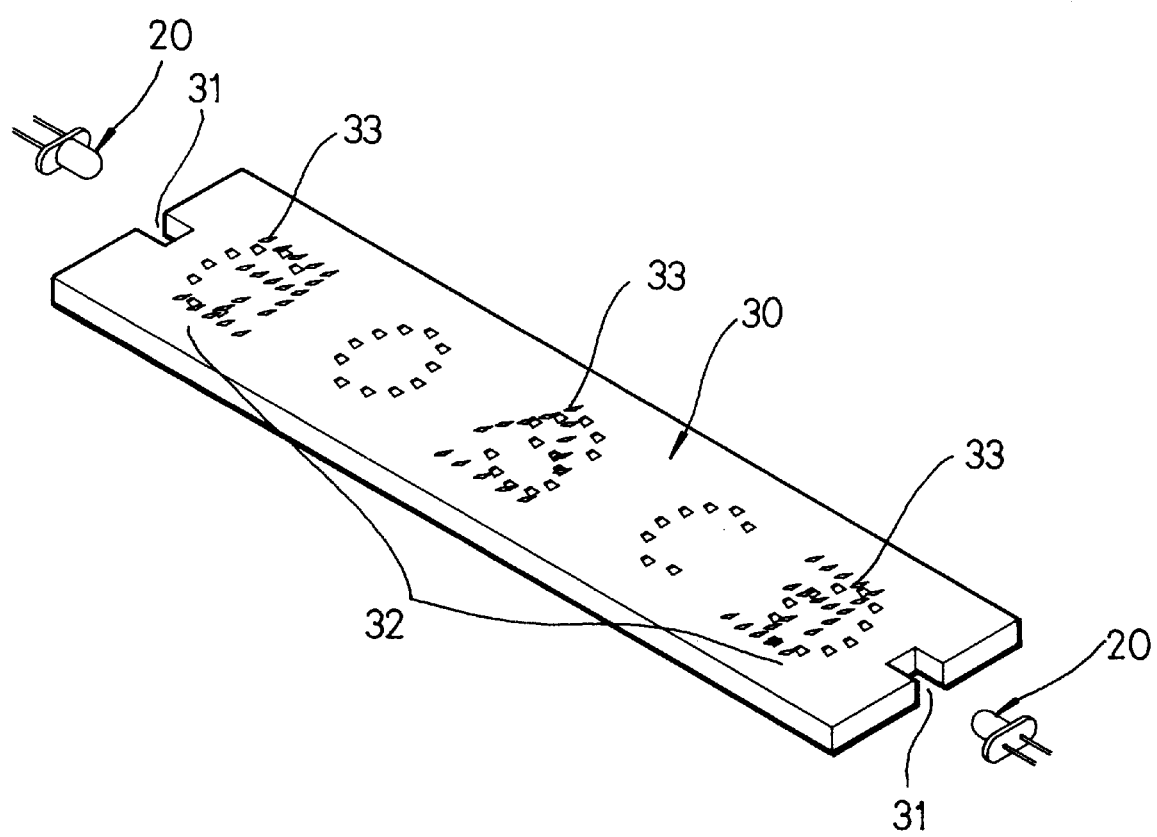
FIGS 10a–10c are perspective views illustrating a further modification of the decorative member provided with the slant reflecting slots as shown in FIG. 6a and its operation.
Figure 10B:
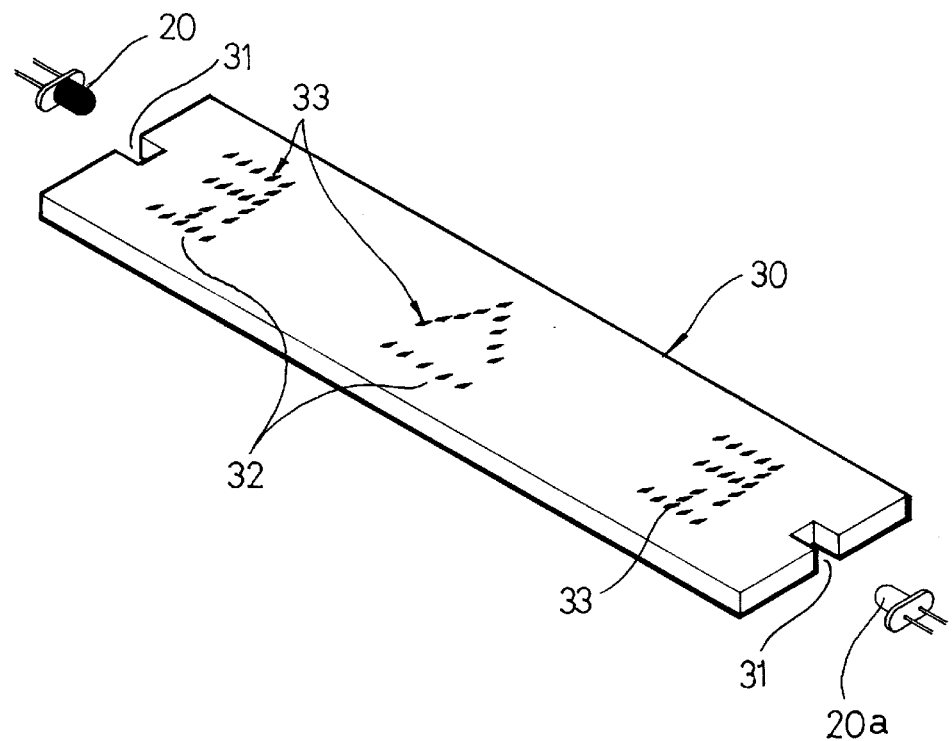
Figure 10C:
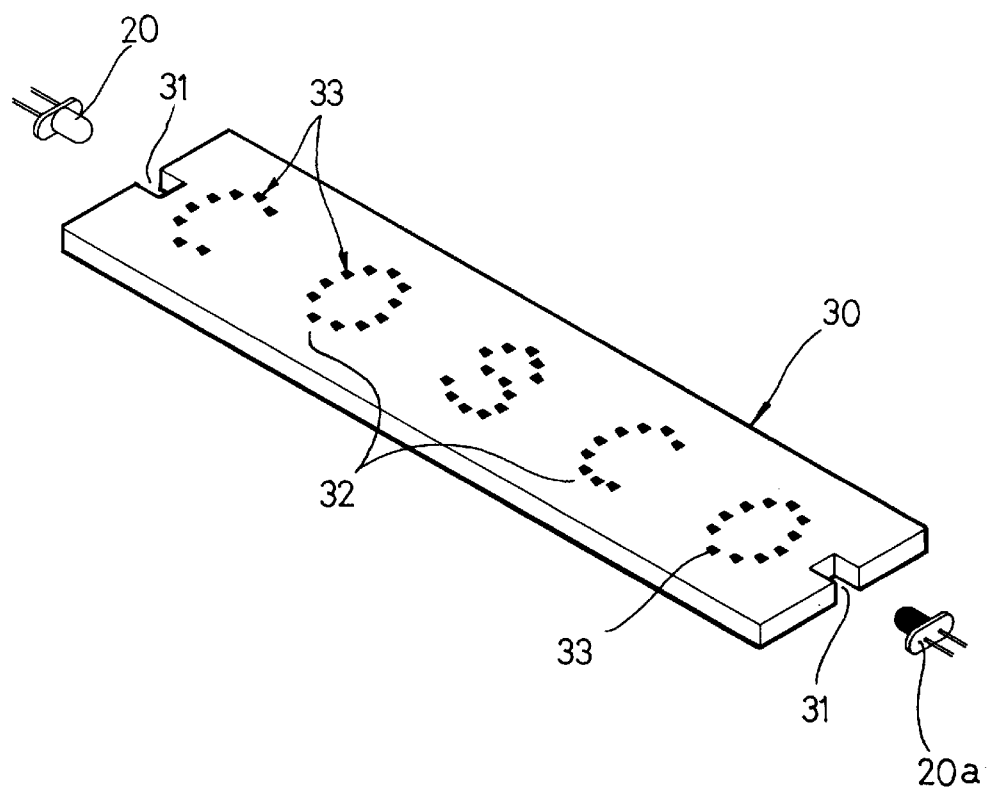
Figure 10D:
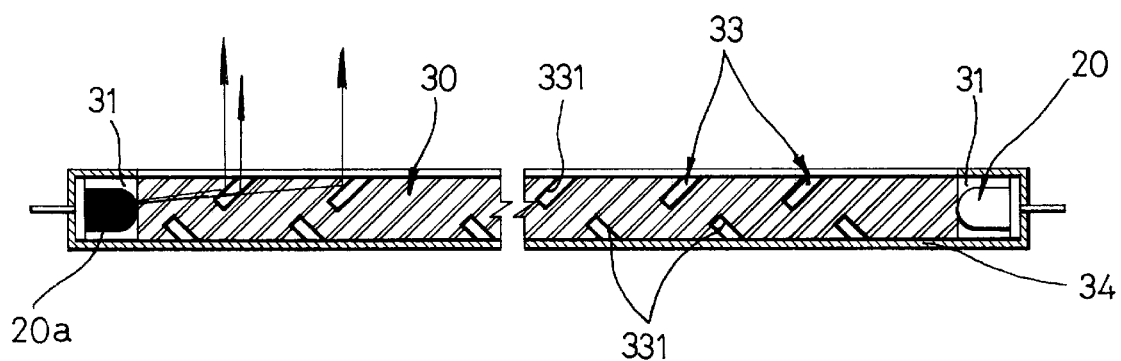
FIGS. 10d and 10e are front views of the member as shown in FIGS. 10a–10c.
Figure 10E:
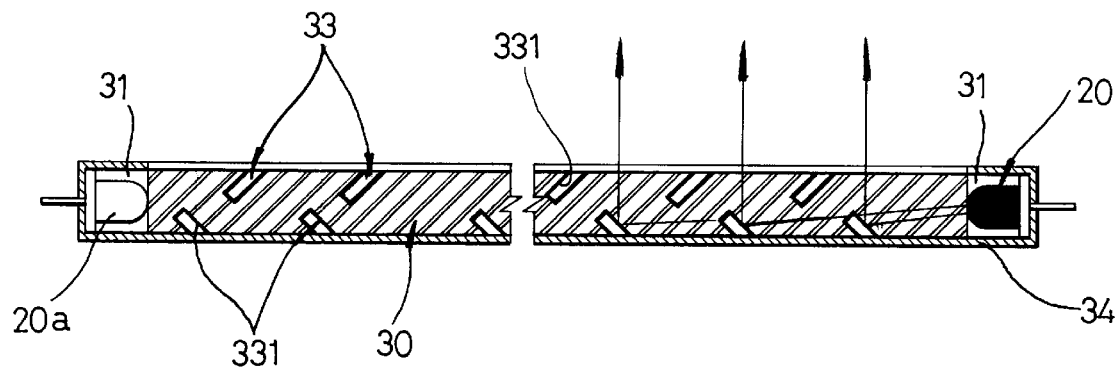

As shown in FIGS. 10b and 10d, the Korean characters "코스코" will glitter, when the luminous member 20 is turned on. In contrast, the English characters "COSCO" are displayed with the luminous member 20a turned on, as shown in FIGS. 10c and 10e. If the luminous members 20 and 20a are different in colors, the two Korean and English characters will be more clearly displayed with the same effect as in the device as shown in FIGS. 9a–9e.

Figure 11:
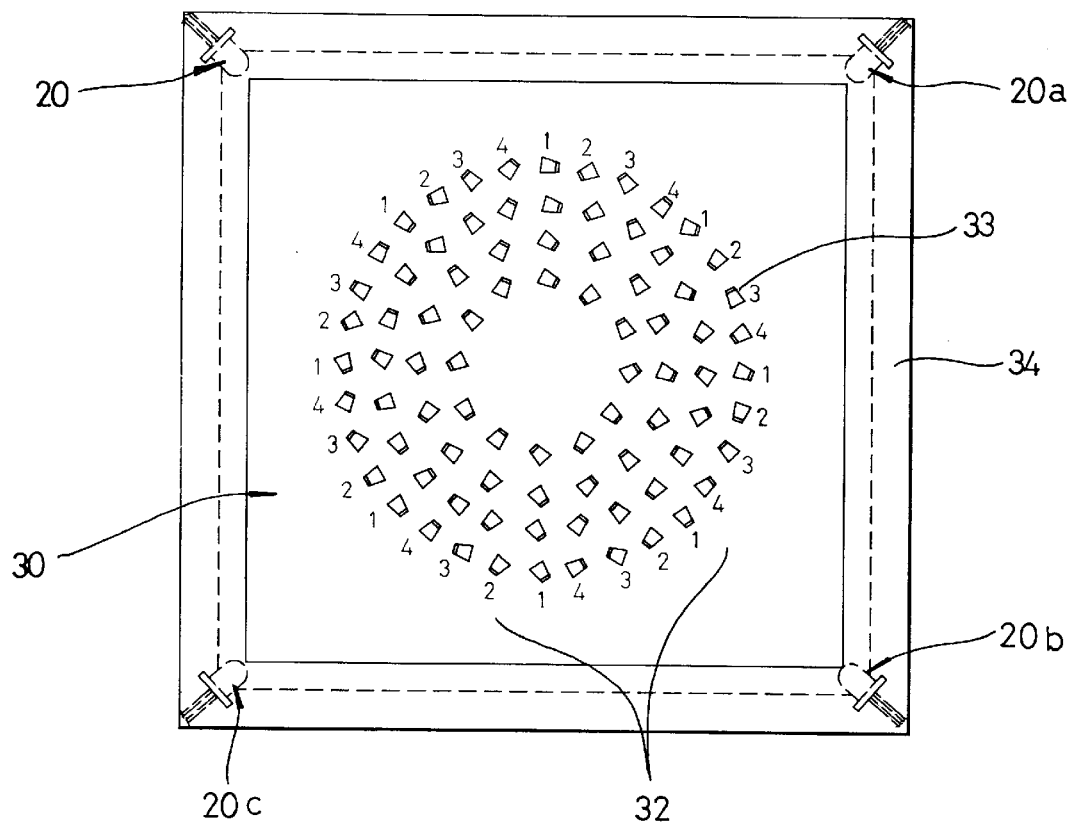
FIG. 11 shows a further modification of the decorative device with the reflecting recesses as shown in FIGS. 6a or 6b.

FIG. 11 illustrates a further example of the device in accordance with the second preferred embodiment of the present invention.

Referring to FIG. 11, numerous reflecting recesses 33 are arranged to form a plurality of the circle shapes 32 with the different diameters on the ornamental member 30. The reflecting faces of the reflecting recesses 33 on one circle 32 are alternately oriented toward four different reflective directions, in which four luminous members 20, 20a, 20b and 20c are disposed respectively.

When the luminous members are sequentially turned on, the reflecting faces of the reflecting recesses 33 oriented toward the same luminous members will alternately reflect lights rays, making the four circle shapes 32 to glitter as if they are rotated.

With the luminous member 20 turned on, light rays are reflected on the reflecting faces of the reflecting recesses in the group 1 formed as the four circle shapes 32 and oriented toward the luminous member 20. The reflecting faces of the reflecting recesses in the groups 2, 3 and 4 reflect light rays off, when the luminous members 20a, 20b and 20c are turned on, respectively.

As the four luminous members 20, 20a, 20b and 20c are turned on in sequence, the reflecting faces of reflecting recesses 33 oriented toward the corresponding luminous members may reflect light rays off, displaying as if the four circle shapes 32 would rotate separately.

The decoration effect will be enhanced, when the four luminous members are different in colors.

Figure 12:
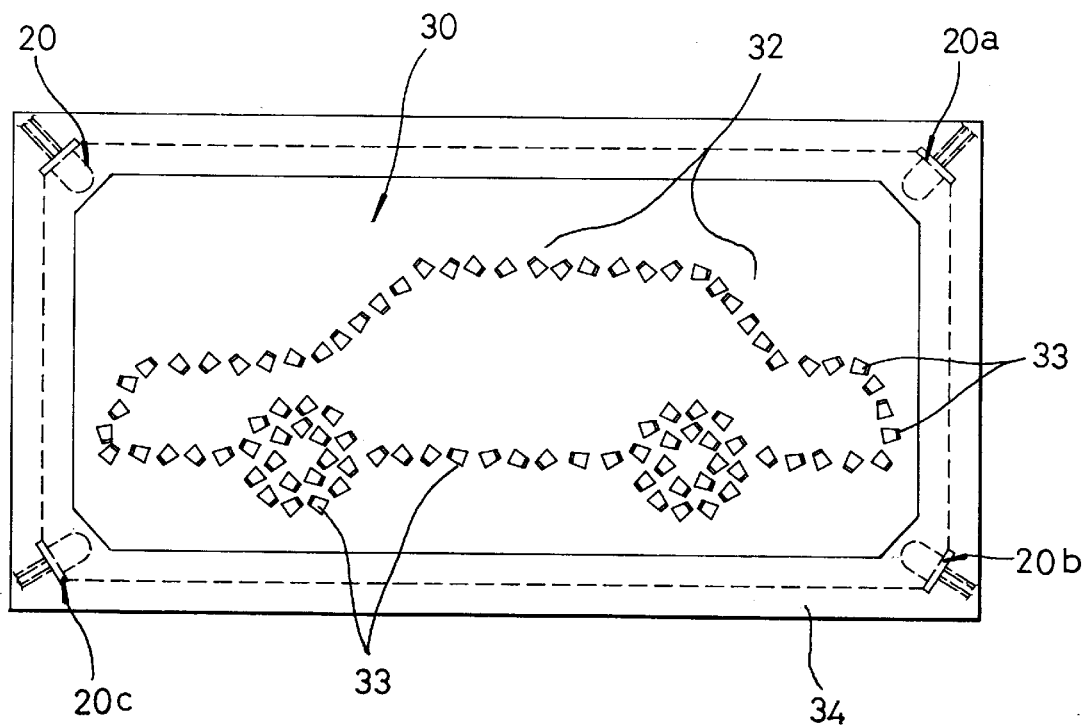
FIG. 12 shows a modification of the device as shown in FIG. 11.

FIG. 12 shows a modification of the device as shown in FIG. 11, in which the reflecting recesses for the wheel parts of a car shape 32 on the ornamental member 30 employ the circle shapes which appear as if they would rotate. The reflecting faces of the reflecting recesses 33 for the shape of the car 32 are also oriented toward four different directions, in which the four luminous members 20, 20a, 20b and 20c are disposed respectively.

When the luminous members are sequentially turned on, the reflecting faces of the reflecting recesses 33 oriented toward the respective luminous members reflect light rays off, displaying the car shape 32 as if its wheels are rotated and the car is running, because the car shape 32 glitters simultaneously with the wheel shapes.

Although in the above devices according to the second preferred embodiment, four luminous members 20, 20a, 20b and 20c are used with reflecting faces oriented toward four different directions to display the circles and wheels, the number of the luminous members, their light emitting directions and the types of the FIG. 32 may vary as required.

Figure 13A:
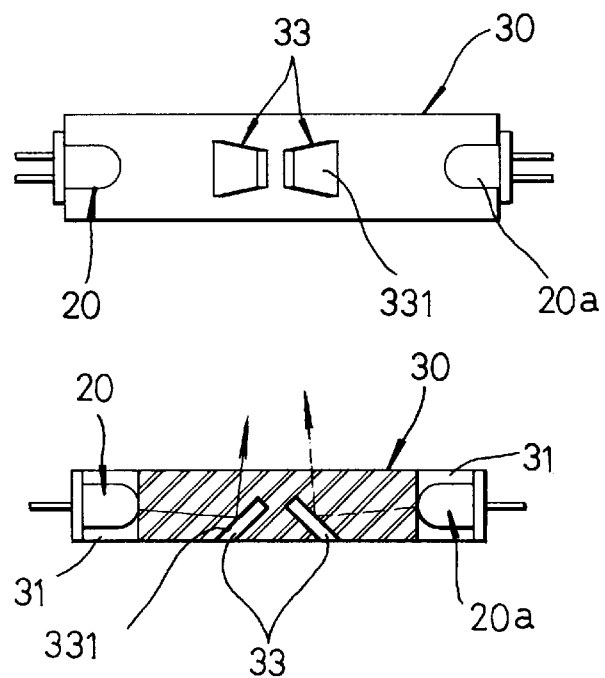
FIG. 13a shows plan and cross-sectional views of a set of two separate reflecting slots in the shape of two oblique sides of an isosceles triangle in cross section.
Figure 13B:
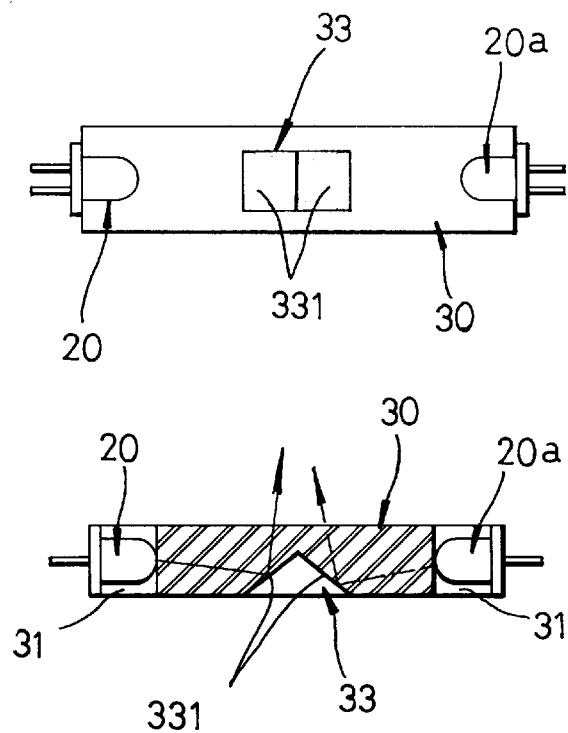
FIG. 13b shows a reflecting recess in the shape of an isosceles triangular prism.

FIG. 13a shows a set of two separate slant reflecting slots 33 formed in the shape of two oblique sides of an isosceles triangular prism, while FIG. 13b shows a reflecting recess 33 formed in the shape of an isosceles triangular prism with two opposed reflecting faces 331.

Figure 14A:
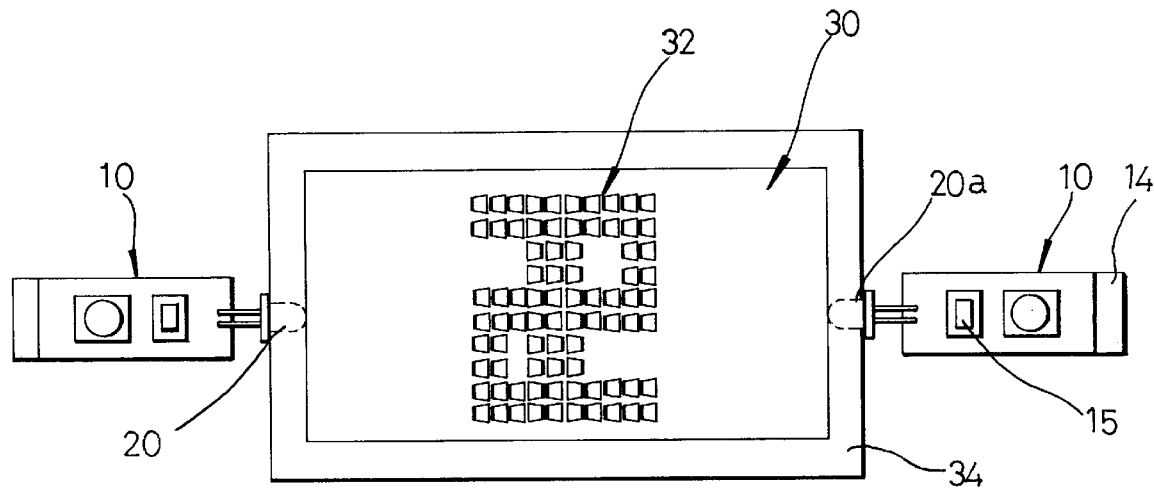
Figure 14B:
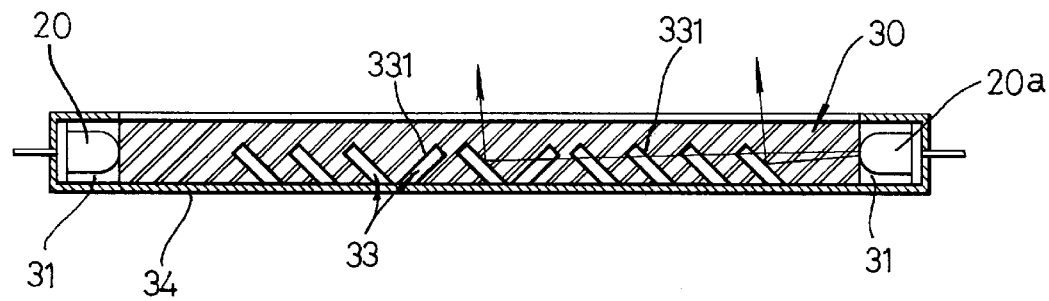
Figure 14C:
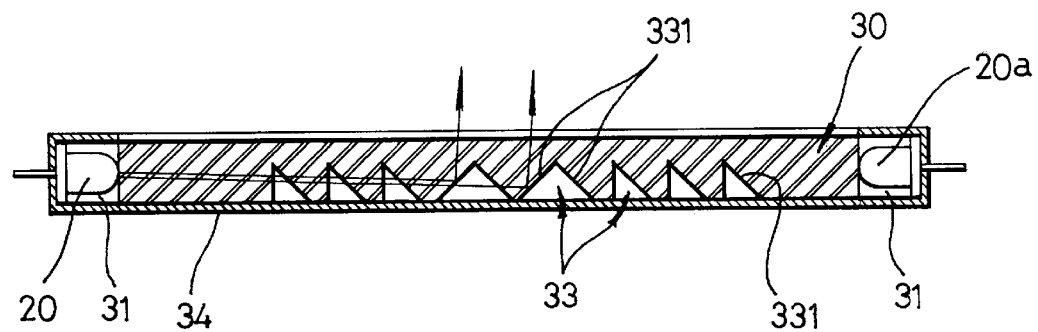
Figure 14D:
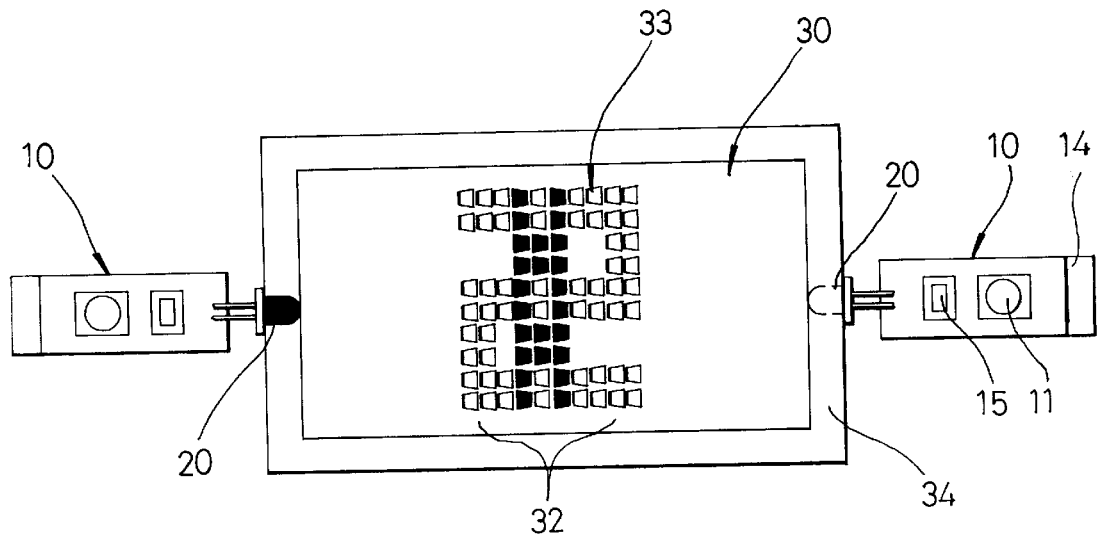
Figure 14E:
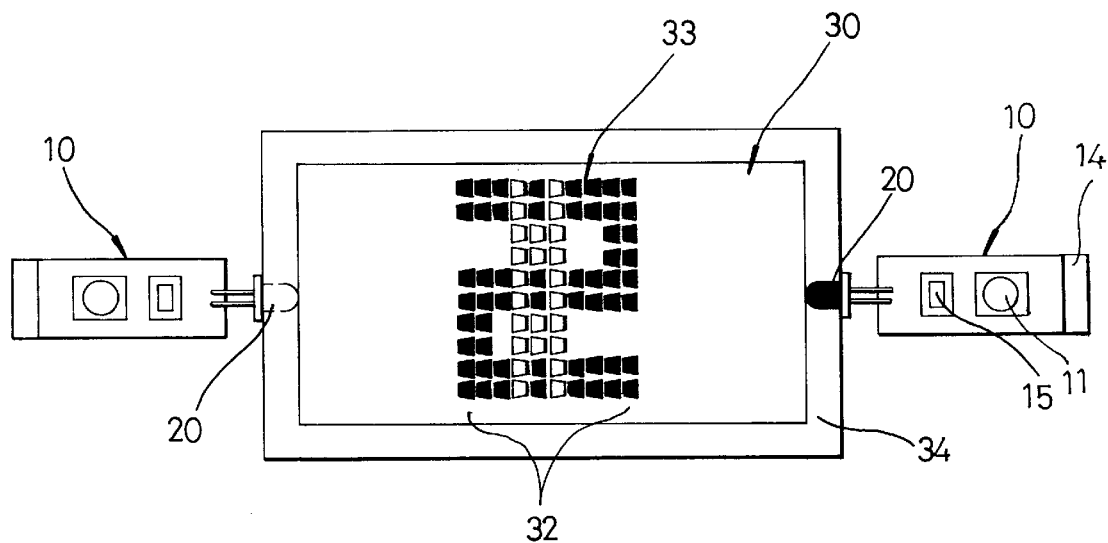

FIGS. 14a–14e show a device according to a third preferred embodiment of the present invention, which includes those reflecting recesses 33 as shown in FIGS. 13a and 13b to display numerals and figures. Referring to FIGS. 14a–14b, the reflecting faces of the reflecting recesses for the numerals "1" and "2" arranged in the overlapping state are formed to have their respective directions toward their corresponding luminous sources. When the luminous member 20 for the numeral "1" is turned on, the corresponding reflecting faces reflect light rays off, displaying only the numeral "1", as shown in FIG. 14d. With the luminous member 20a on, only the numeral "2" is displayed, as shown in FIG. 14e.

Although the example of the third preferred embodiment was explained about displaying numerals "1" and "2", this embodiment is not limited to that device and it is desirable to use the luminous members in different colors and the separate melody generators 10 for the objects to be displayed.

Figure 15A:
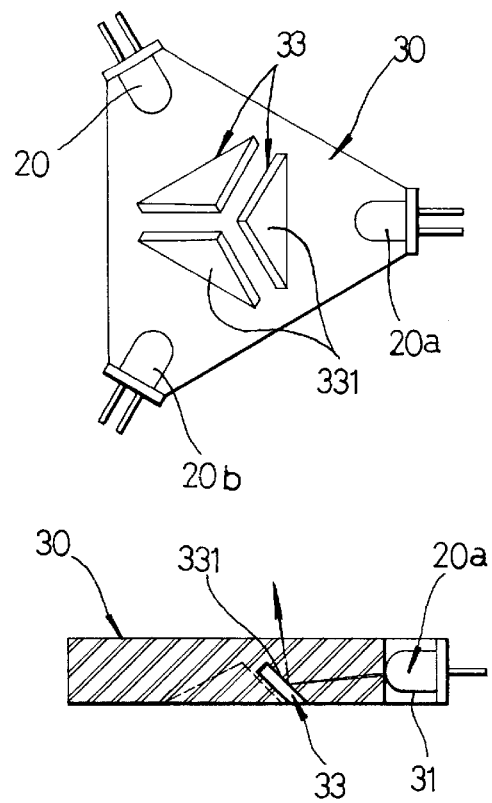
FIG. 15a shows plan and cross-sectional views of a set of three separate slant reflecting slots forming the three walls of a trigonal pyramid shape.
Figure 15B:
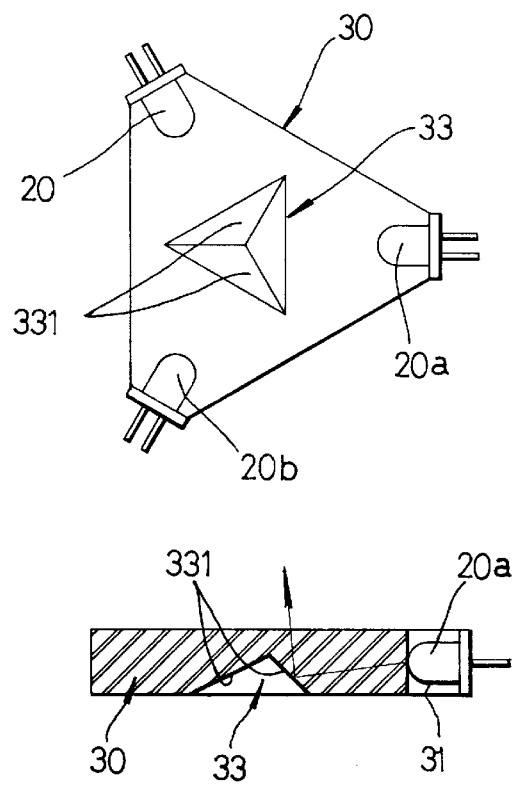
FIG. 15b shows plan and cross-sectional views of a trigonal pyramid shape recess.

FIGS. 15a and 15b illustrate a set of three slant reflecting slots 33 arranged to form three separate walls of a trigonal pyramid shape and a reflecting recess 33 formed in the shape of a trigonal pyramid, respectively. Those three reflecting faces 331 are oriented toward three different directions, in which three luminous members 20, 20a and 20b are disposed separately.

When the three luminous members are turned on at the same time or in sequence, the three reflecting faces 331 reflect light rays off to three directions simultaneously or sequentially. It is desirable that the three luminous members are different in colors.

Figure 16A:
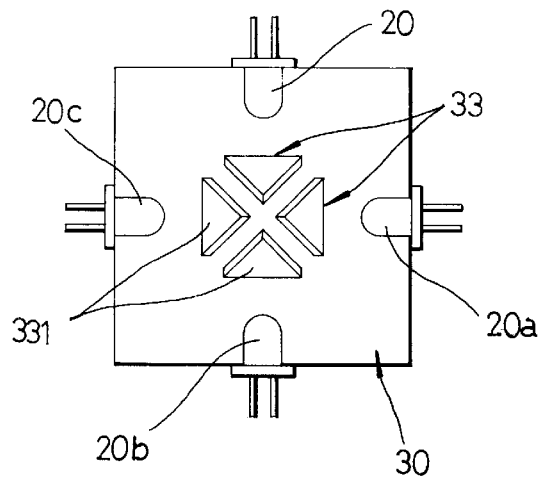
FIG. 16a is plan and cross-sectional views of a set of four slant reflecting slots forming the four walls of a pyramid shape.
Figure 16A:
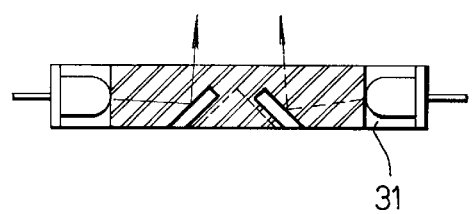
Figure 16B:
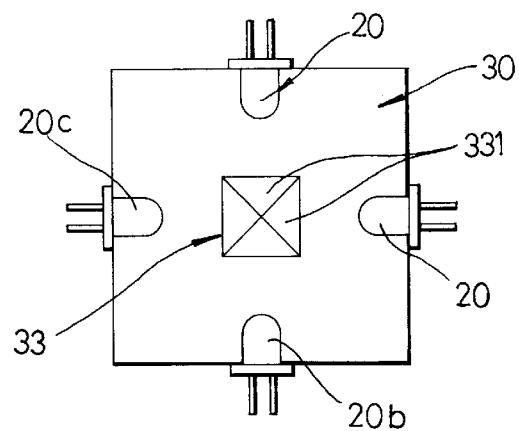
FIG. 16b is plan and cross-sectional views of a pyramid shape reflecting recess.
Figure 16B:
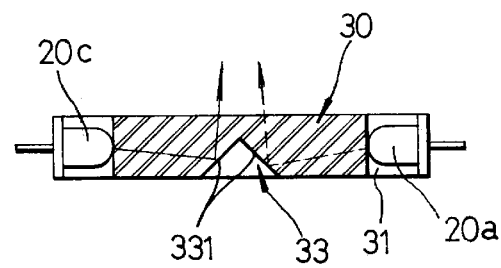
Figure 17:
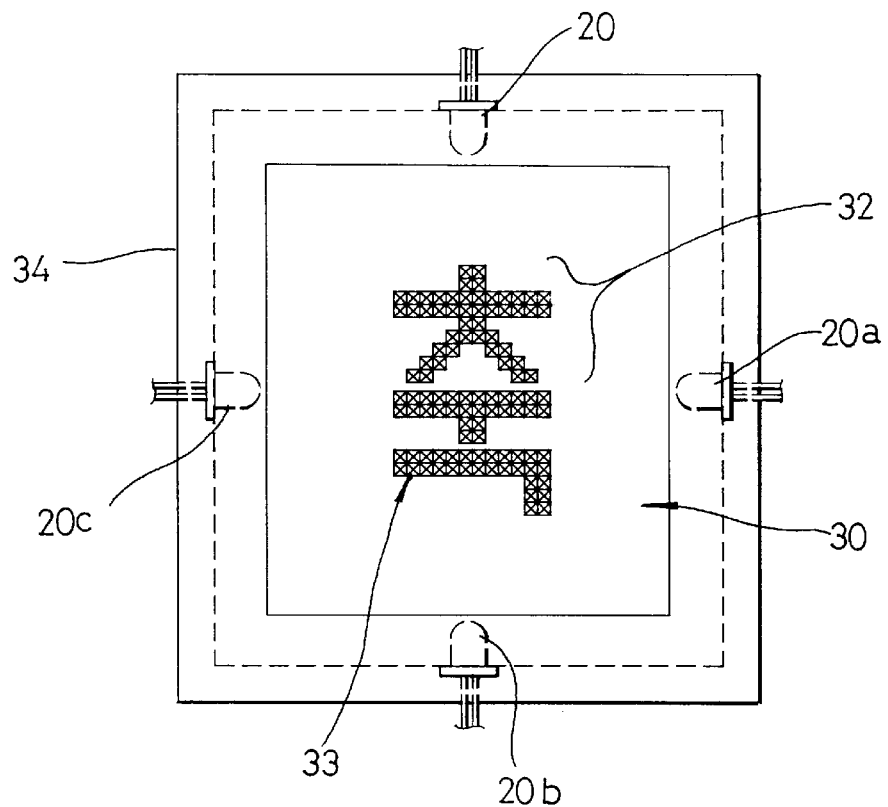
FIG. 17 shows a decorative panel according to a fourth preferred embodiment of the invention, provided with the reflecting recesses of FIG. 16a or 16b.
Figures 18A, 18B:
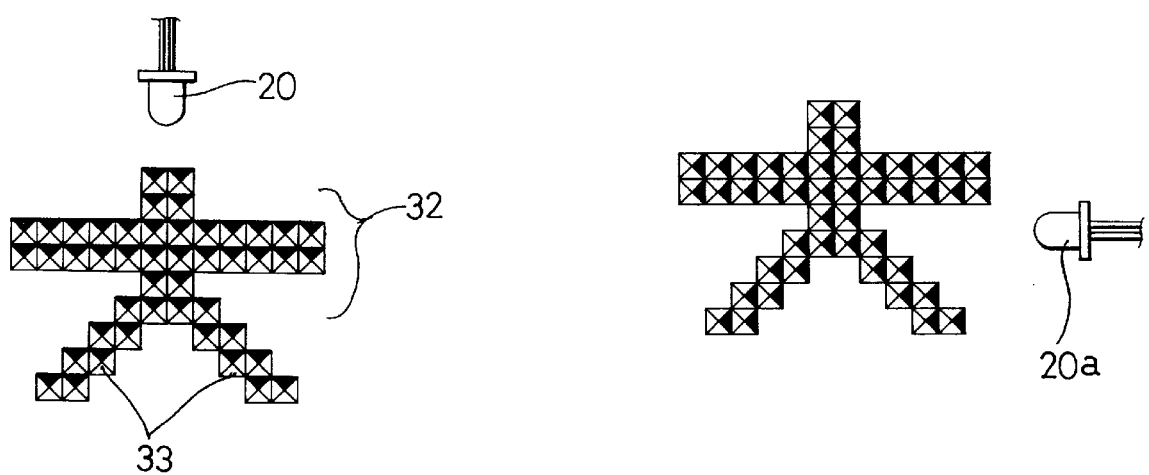
FIGS. 18a–18d are views illustrating the operation of a part of the panel as shown in FIG. 17.
Figure 18C:
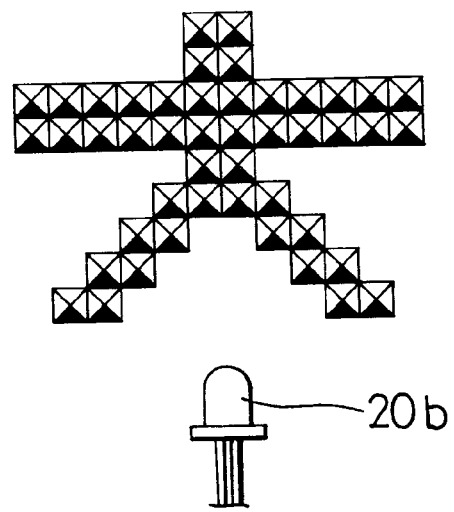
Figure 18D:
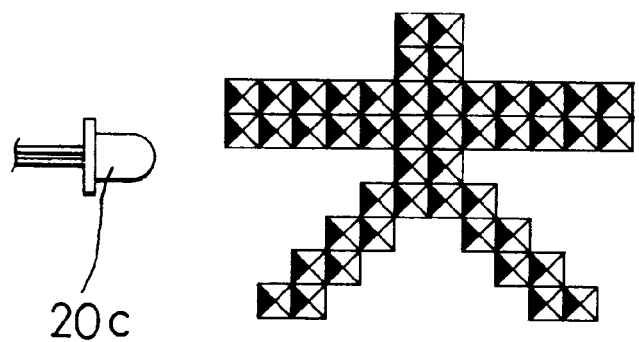

FIG. 16a shows a set of four separate reflecting slots 33 arranged to form four separate walls of a normal pyramid shape and FIG. 16b shows a reflecting recess 33 formed in the shape of a pyramid, with four reflecting faces 331 oriented toward four different directions in which four luminous members 20, 20a, 20b and 20c are disposed separately.

When the four luminous members are turned on at the same time or in sequence, the four reflecting faces 331 reflect light rays off to four different directions simultaneously or sequentially.

FIGS. 17 and 18a–18d illustrate a device in accordance with a fourth preferred embodiment of the present invention.

The reflecting recesses 33, each of which has a shape of the pyramid or four individual slant slots of which form four separate walls of a pyramid shape as a set, are disposed to display a Korean character "축" with the meaning of congratulations in English. The Korean character "축" may be displayed with various colors, when four luminous members in different colors 20, 20a, 20b and 20c are turned on at the same time, the character will seem to move a little toward four different directions and will be displayed with different colors, when the four luminous members are sequentially turned on, as shown in FIGS. 18a–18d.

Figure 19A:
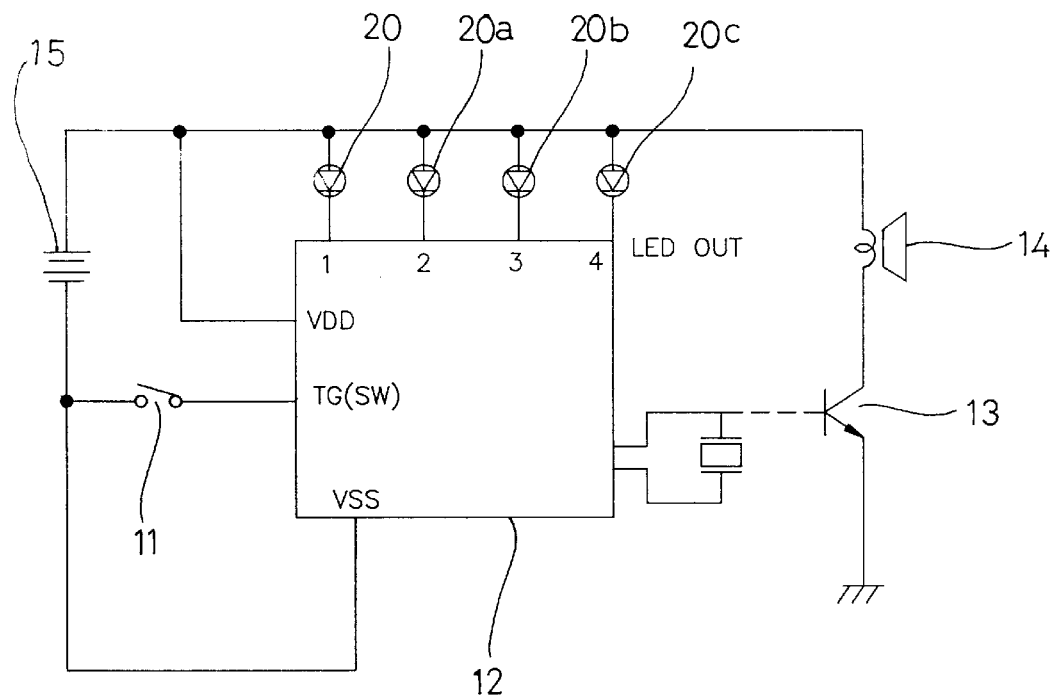
FIGS. 19a and 19b are other circuit diagrams applied to the devices according to the present invention.
Figure 19B:
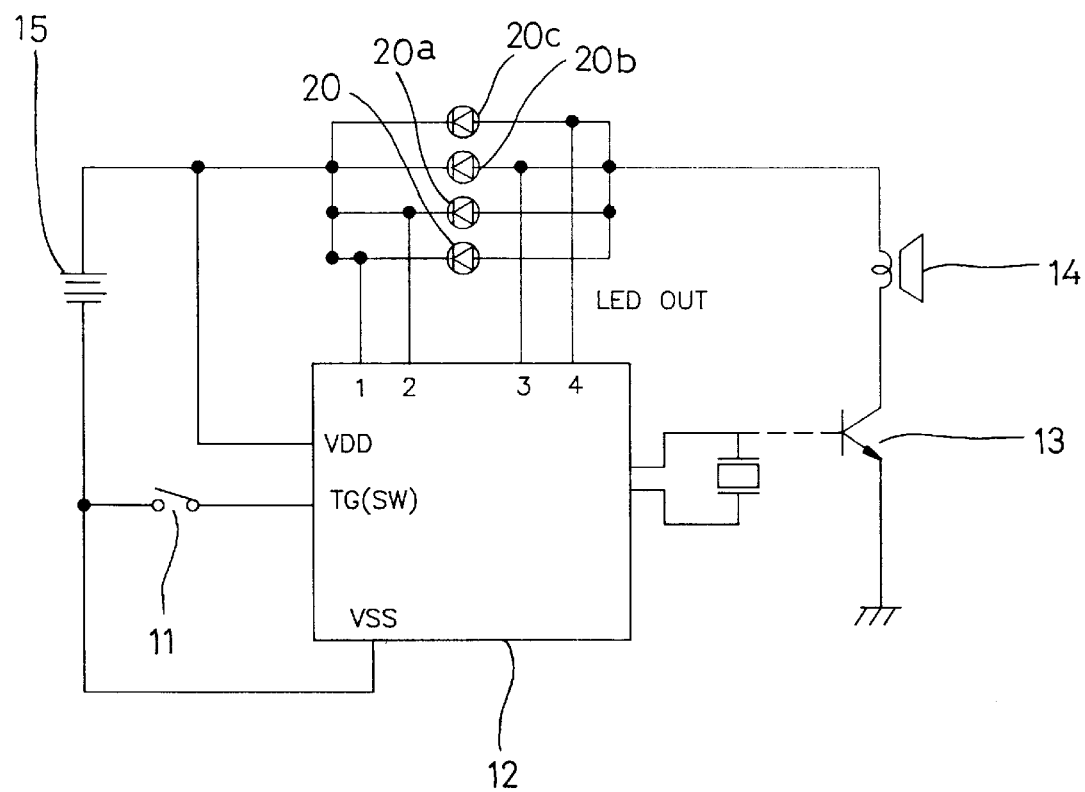

FIGS. 19a and 19b are examples of the electric circuits for applying to the devices according to the present invention, which are self-explanatory.

Although the ornamental members 30 were described to be flat or plane in the above preferred embodiments, the present invention is not limited thereto and the surface of the ornamental member 30 may have elevations or depressions, for example.

The reflecting faces 331 are desirably inclined with an angle of approximately 45 degrees.

In the luminous decorative devices in accordance with the preferred embodiments of the present invention as described above, various types of characters or complicated figures may be displayed by means of the ornamental member formed with numerous reflecting recesses which have slant or semicircular reflecting faces in cross section, or which are formed in the shapes of the triangle bar, the trigonal pyramid or the normal pyramid. As the characters or figures can be clearly displayed with the luminous members, the present invention can provide an excellent visual effect as well as an audio effect from a usual melody generator, thereby enhancing celebratory and decorative effects.

The present invention can also be applied to the advertisement sign boards for various types of use in addition to celebratory and decorative uses, because characters or figures may be glitteringly displayed like neon signs with luminous members in different colors. members in different colors It will be to those skilled in the art that various modifications and variations can be made in the luminous decorative devices of the present invention without departing from the spirit or scope of the invention. Thus, it is intended that the present invention covers the modifications and variations of this invention, provided they come within the scope of the appended claims and their equivalents.

What is claimed is:

1. A luminous decorative device comprising:
   a melody generator which is provided with a melody IC element and operated by a switch for reproducing a melody or music through a speaker;
   a luminous source which is coupled to the melody generator and turned on and off in conjunction with the operation of the melody generator; and
   a transparent member which is provided with the luminous member therein and has at least one displaying surface and one series of recesses arranged adjacent each other to form at least one continuous pattern, wherein each of the recesses includes at least a reflecting face which reflects light rays visually displaying the continuous pattern on the displaying surface of the transparent member with a substantially consistent intensity throughout the pattern.

2. A device of claim 1, wherein the reflecting recesses are formed to have a semicircular cross section.

3. A device of claim 2, wherein one or more additional luminous sources are arranged for illuminating the proximate reflecting recesses.

4. A device of claim 1, wherein the reflecting recesses are formed in the shape of a slant slot and have two substantially parallel reflecting faces.

5. A device of claim 4, wherein one or more additional luminous members are arranged for illuminating the corresponding group of the reflecting slots with the same inclination.

6. A device of claim 1, wherein the reflecting recesses are formed in the shape of a right-angled triangular prism with its oblique side used as the reflecting face.

7. A device of claim 4, wherein sets of two separate reflecting slots forming the shape of two oblique sides of an isosceles triangular prism are provided and the two outside reflecting faces thereof are oriented toward the respective luminous members.

8. A device of claim 1, wherein the reflecting recesses are formed in the shape of an isosceles triangular prism and the two oblique sides thereof are oriented toward the respective luminous members.

9. A device of claim 4, wherein sets of three separate reflecting slots forming the shape of three walls of a trigonal pyramid are provided and the three outside reflecting faces thereof are oriented toward the respective luminous members.

10. A device of claim 1, wherein the reflecting recesses are formed in the shape of a trigonal pyramid and the three reflecting faces thereof are oriented toward the respective luminous members.

11. A device of claim 4, wherein sets of four separate reflecting slots forming the shape of four walls of a normal pyramid are provided and the four outside reflecting faces thereof are oriented toward the respective luminous members.

12. A device of claim 1, wherein the reflecting recesses are formed in the shape of a normal pyramid and the four reflecting faces thereof are oriented toward the respective luminous members.

13. A device of claim 2, wherein the transparent member comprises two or more overlapped plates or boards, which have their respective reflecting recesses provided with the corresponding luminous members.

14. A device of claim 4, wherein both of the upper and lower surfaces of the transparent member are formed with two separate groups of the reflecting slots, the reflecting faces of the reflecting slots in each group being oriented toward the corresponding luminous member in the opposite end.

15. A device of claim 4, wherein the reflecting faces of the reflecting recesses have an inclination of 45 degrees.

16. A device of claim 3, wherein the luminous members are LEDs emitting different colors of light.

17. A device of claim 1, wherein the transparent member is formed with a declined upper surface, in the thicker end of which the luminous member is disposed.

18. A device of claim 1, wherein the thickness of the transparent member is reduced inwardly from the circumference and a plurality of the luminous members are disposed at the circumference, corresponding to the number of the characters or figures formed on the decorative member and of the colors desired to be used.

19. A luminous device comprising a transparent member having a displaying surface and a luminous source within the transparent member which emits light rays;

the transparent member including at least one series of recesses arranged adjacent each other to form at least one continuous pattern;

each of the recesses including at least one reflecting face that is positioned to directly reflect the light rays emitted from the luminous source towards the displaying surface so that the reflected light rays display the continuous pattern on the displaying surface of the transparent member with a substantial consistent intensity throughout the pattern.

* * * * *